US012638660B2

(12) United States Patent
Gao et al.

(10) Patent No.: US 12,638,660 B2
(45) Date of Patent: May 26, 2026

(54) OPTICAL IMAGING LENS ASSEMBLY

(71) Applicant: Zhejiang Sunny Optics Co., Ltd,
Yuyao City (CN)

(72) Inventors: Chunchun Gao, Yuyao City (CN); Yu Zhou, Yuyao City (CN); Fang Zhang, Yuyao City (CN); Liefeng Zhao, Yuyao City (CN); Fujian Dai, Yuyao City (CN)

(73) Assignee: Zhejiang Sunny Optics Co., Ltd (CN)

( * ) Notice: Subject to any disclaimer, the term of this patent is extended or adjusted under 35 U.S.C. 154(b) by 515 days.

(21) Appl. No.: 18/138,695

(22) Filed: Apr. 24, 2023

(65) Prior Publication Data

US 2024/0176107 A1      May 30, 2024

(30) Foreign Application Priority Data

Nov. 29, 2022    (CN) .......................... 202211509535.2

(51) Int. Cl.
*G02B 13/00*        (2006.01)
*G02B 7/02*         (2021.01)
*G02B 9/62*         (2006.01)

(52) U.S. Cl.
CPC ......... *G02B 13/0045* (2013.01); *G02B 7/021* (2013.01); *G02B 9/62* (2013.01)

(58) Field of Classification Search
CPC ....... G02B 13/0045; G02B 7/021; G02B 9/62
See application file for complete search history.

(56) References Cited

FOREIGN PATENT DOCUMENTS

CN          111208617 A   *   5/2020   ............. G02B 7/021

OTHER PUBLICATIONS

CN-111208617-A, translation (Year: 2020).*

* cited by examiner

*Primary Examiner* — Wen Huang
(74) *Attorney, Agent, or Firm* — Barnes & Thornburg

(57) ABSTRACT

The present disclosure discloses an optical imaging lens assembly. The optical imaging lens assembly includes: a lens group, including sequentially along an optical axis from an object side to an image side: a first lens, a second lens, a third lens, a fourth lens, a fifth lens and a sixth lens that have refractive powers, where there is an air spacing between any adjacent two lenses in the first lens to the sixth lens along the optical axis, and an air spacing between the fifth lens and the sixth lens is minimum; at least one spacing element, including: a fourth spacing element disposed on an image side of the fourth lens and partially in contact with an image-side surface of the fourth lens; and a lens barrel, for accommodating the lens group and the at least one spacing element. The optical imaging lens assembly satisfies:

$$4.0 < R8/d4s + T45/CP4 < 11.5.$$

18 Claims, 9 Drawing Sheets

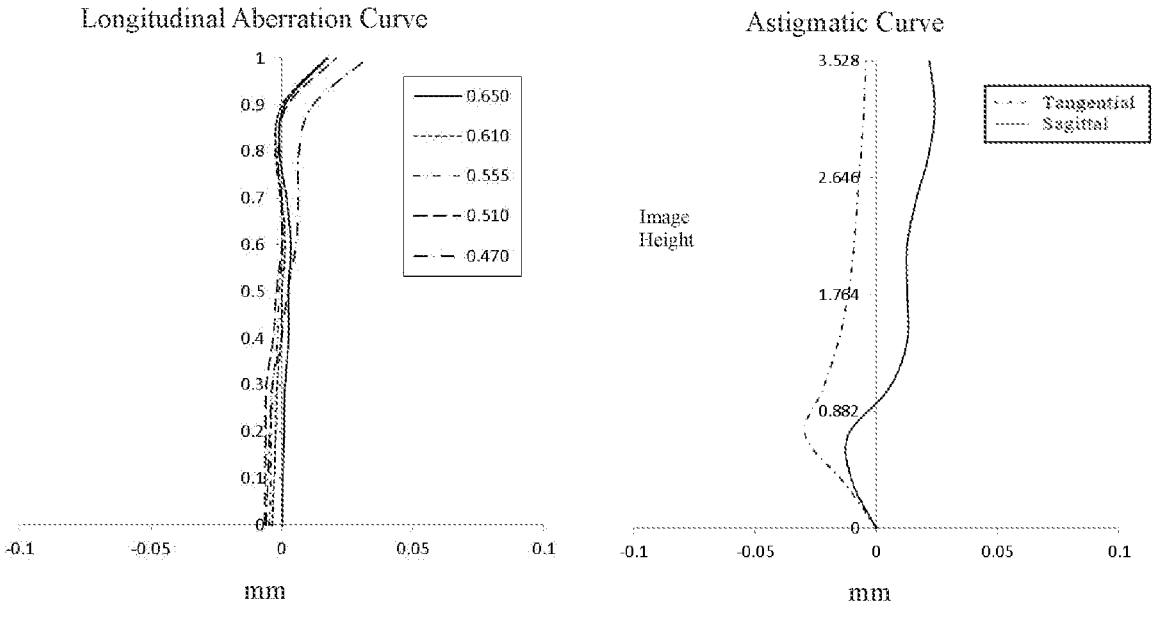
FIG. 2A               FIG. 2B
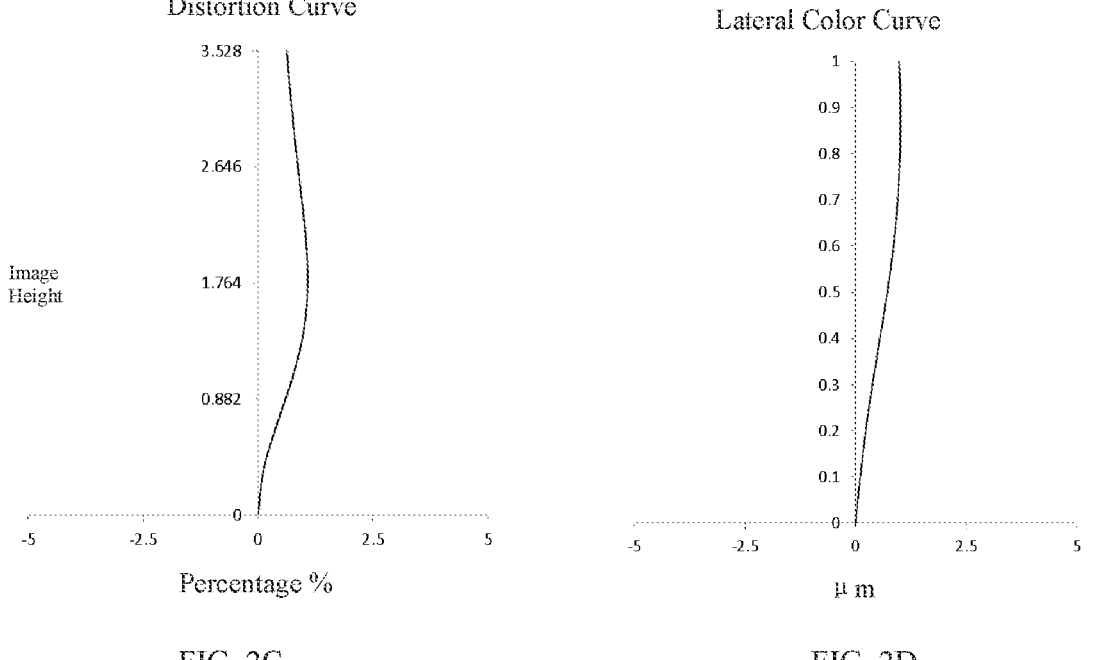
FIG. 2C               FIG. 2D

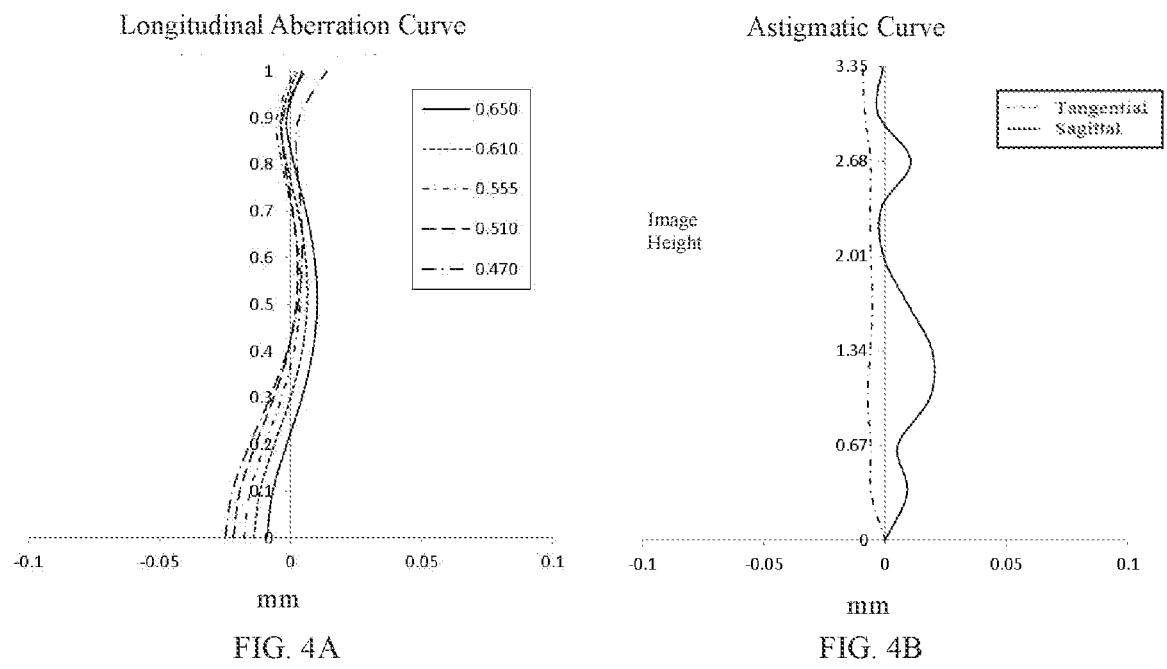
FIG. 4A
FIG. 4B
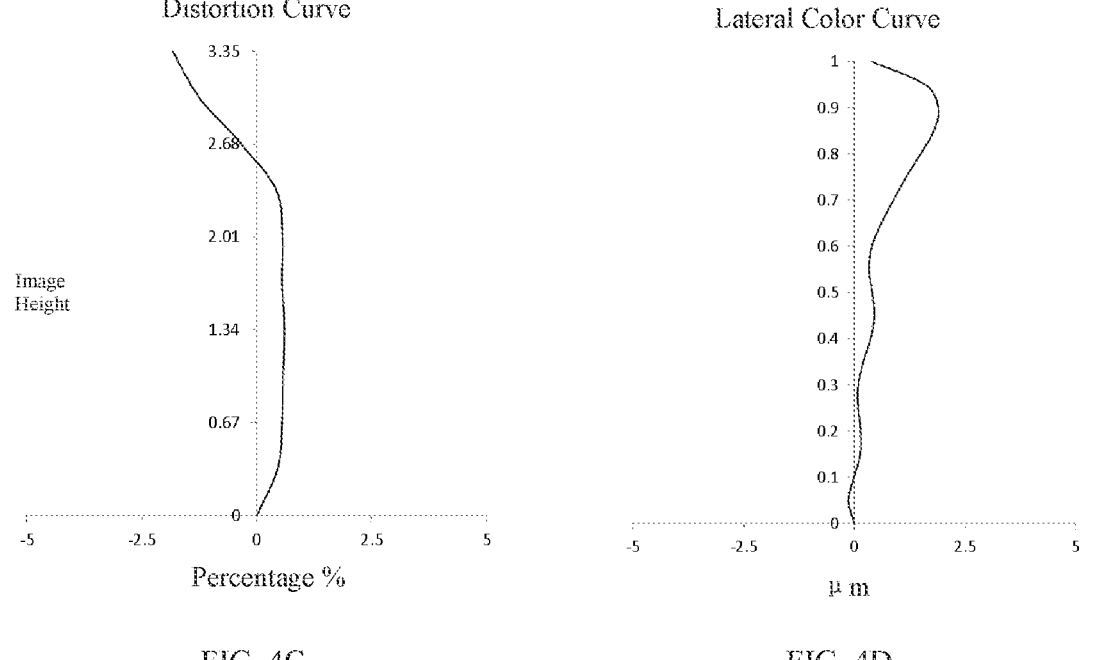
FIG. 4C
FIG. 4D

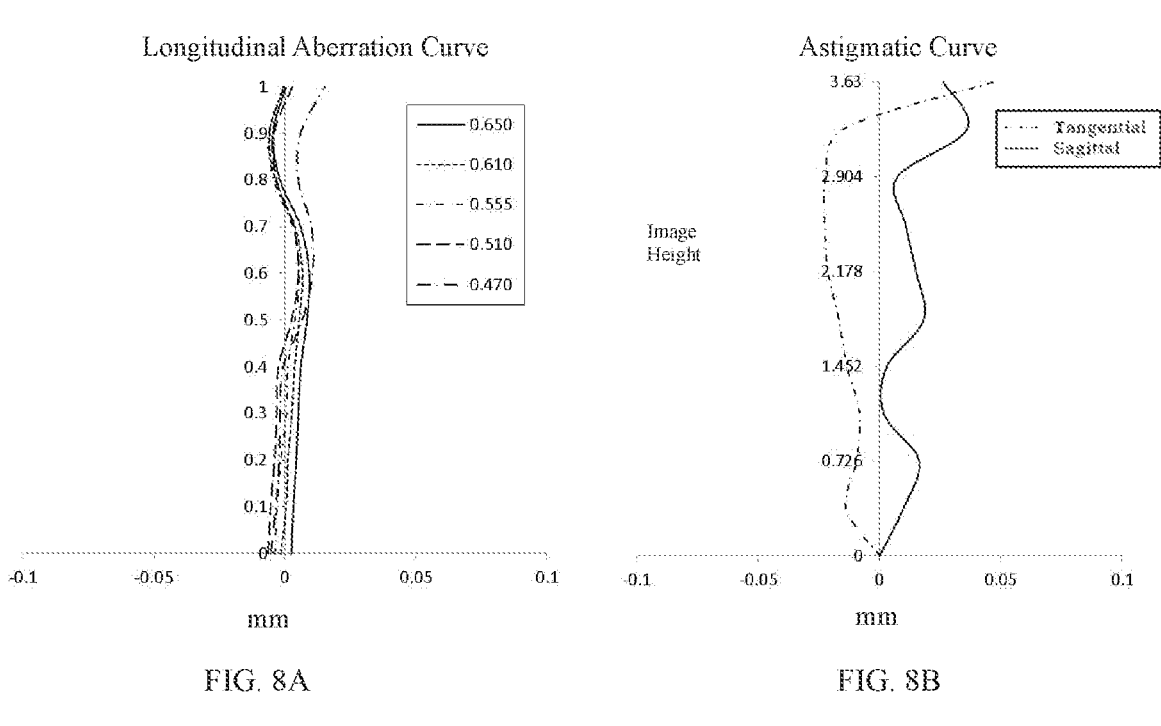
FIG. 8A
FIG. 8B
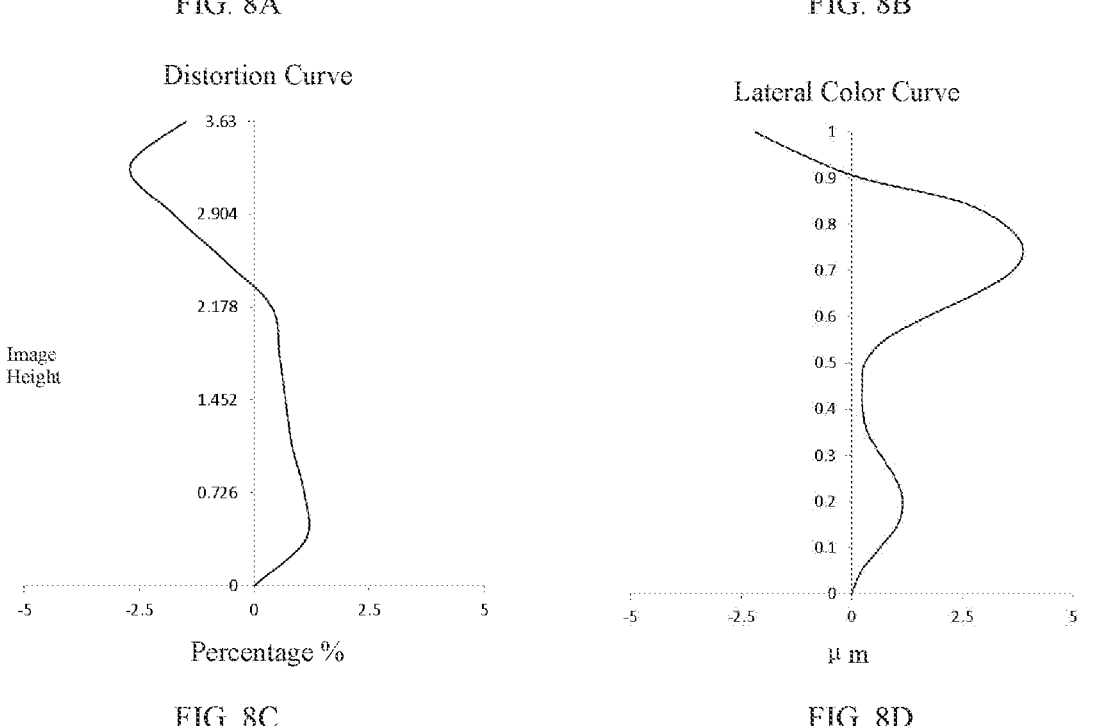
FIG. 8C
FIG. 8D

OPTICAL IMAGING LENS ASSEMBLY

CROSS-REFERENCE TO RELATED APPLICATIONS

This application claims priority to Chinese Patent Application No. 202211509535.2 filed on Nov. 29, 2022 before the China National Intellectual Property Administration, the entire disclosure of which is incorporated herein by reference in its entity.

TECHNICAL FIELD

The present disclosure relates to the field of optical elements, in particular, to an optical imaging lens assembly.

BACKGROUND

In recent years, continuous update and iteration of mobile electronic devices has promoted the continuous optimization and upgrading of related industries, such as the most representative mobile phone industry. At the same time, continuous optimization and upgrading of the mobile phone industry has driven the continuous iteration and upgrading of optical imaging lens assemblies mounted on mobile phones. Camera technology of mobile phones has become one principal factor to improve the competitiveness of the mobile phones.

At present, ultra-wide-angle lens assemblies have become one of the objectives pursued by lens assembly manufacturers because of their stunning viewing appearance. However, the sizes of the first lenses in the ultra-wide-angle lens assemblies on the market are often large, and the first lenses using aspheric design are also prone to internal reflection stray light, etc. Therefore, how to reasonably arrange lenses, spacing elements and lens barrel structure in the optical imaging lens assemblies and reasonably set optical technical parameters, etc. of the optical imaging lens assemblies to enable the first lenses in the wide-angle lens assemblies have less internal reflection stray light is one of the urgent problems to be solved in the field of optical imaging.

SUMMARY

In an aspect, the present disclosure provides an optical imaging lens assembly, and the optical imaging lens assembly includes sequentially along an optical axis from an object side to an image side a lens group, at least one spacing element, and a lens barrel for accommodating the lens group and the at least one spacing element. The lens group includes sequentially along the optical axis from the object side to the image side a first lens, a second lens, a third lens, a fourth lens, a fifth lens and a sixth lens that have refractive powers, where there is an air spacing between any adjacent two lenses in the first lens to the sixth lens along the optical axis, and an air spacing between the fifth lens and the sixth lens is minimum. The at least one spacing element includes a fourth spacing element disposed on an image side of the fourth lens and partially in contact with an image-side surface of the fourth lens. The optical imaging lens assembly may satisfy: $4.0<R8/d4s+T45/CP4<11.5$, where R8 is a radius of curvature of the image-side surface of the fourth lens, T45 is an air spacing between the fourth lens and the fifth lens on the optical axis, d4s is an inner diameter of an object-side surface of the fourth spacing element, and CP4 is a maximum thickness of the fourth spacing element.

In an implementation, the at least one spacing element further includes a first spacing element disposed on an image side of the first lens and partially in contact with an image-side surface of the first lens.

In an implementation, the optical imaging lens assembly may satisfy: $1.5<R2\times(D1s-d1s)/|R1\times(D0s-d0s)|<5.0$, where R1 is a radius of curvature of an object-side surface of the first lens, R2 is a radius of curvature of an image-side surface of the first lens, D1s is an outer diameter of an object-side surface of the first spacing element, d1s is an inner diameter of the object-side surface of the first spacing element, D0s is an outer diameter of an object-side end of the lens barrel, and d0s is an inner diameter of the object-side end of the lens barrel.

In an implementation, at least one surface from the object-side surface of the first lens to an image-side surface of the sixth lens is an aspheric surface.

In an implementation, the at least one spacing element further includes a second spacing element disposed on an image side of the second lens and partially in contact with an image-side surface of the second lens, the optical imaging lens assembly may satisfy: $4.5<f2/(d1m-d2s)\leq8.0$, where f2 is an effective focal length of the second lens, d1m is an inner diameter of an image-side surface of the first spacing element, and d2s is an inner diameter of an object-side surface of the second spacing element.

In an implementation, the optical imaging lens assembly may satisfy: $-1.5<(EP01+T12)/(R1+R2)<-0.5$, where EP01 is a spacing distance from the object-side end of the lens barrel to the object-side surface of the first spacing element in a direction along the optical axis, T12 is an air spacing between the first lens and the second lens on the optical axis, R1 is the radius of curvature of the object-side surface of the first lens, and R2 is the radius of curvature of the image-side surface of the first lens.

In an implementation, the optical imaging lens assembly may satisfy: $2.0<R4\times(D2s-d2s)/(R3\times(D1m-d1m))<4.0$, where R3 is a radius of curvature of an object-side surface of the second lens, R4 is a radius of curvature of the image-side surface of the second lens, D2s is an outer diameter of the object-side surface of the second spacing element, d2s is the inner diameter of the object-side surface of the second spacing element, D1m is an outer diameter of the image-side surface of the first spacing element, and d1m is the inner diameter of the image-side surface of the first spacing element.

In an implementation, the at least one spacing element further includes a third spacing element disposed on an image side of the third lens and partially in contact with an image-side surface of the third lens, the optical imaging lens assembly may satisfy: $4.5<|f3/EP12+f4/EP23|<11.0$, where f3 is an effective focal length of the third lens, f4 is an effective focal length of the fourth lens, EP12 is a spacing distance between the image-side surface of the first spacing element and the object-side surface of the second spacing element in the direction along the optical axis, and EP23 is a spacing distance between an image-side surface of the second spacing element and an object-side surface of the third spacing element in the direction along the optical axis.

In an implementation, the optical imaging lens assembly may satisfy: $6.0<R4/d2s+R5/d3s<20.0$, where R4 is a radius of curvature of the image-side surface of the second lens, R5 is a radius of curvature of an object-side surface of the third lens, d2s is the inner diameter of the object-side surface of the second spacing element, and d3s is an inner diameter of the object-side surface of the third spacing element.

In an implementation, the optical imaging lens assembly may satisfy: $-3.0 < R6/(EP23+CP3+CT2) < -2.0$, where R6 is a radius of curvature of the image-side surface of the third lens, EP23 is the spacing distance between the image-side surface of the second spacing element and the object-side surface of the third spacing element in the direction along the optical axis, CP3 is a maximum thickness of the third spacing element, and CT2 is a center thickness of the second lens on the optical axis.

In an implementation, the optical imaging lens assembly may satisfy: $3.5 < |f4/(EP34-CT4)+R7/D4s| < 12.0$, where f4 is the effective focal length of the fourth lens, EP34 is a spacing distance between an image-side surface of the third spacing element and an object-side surface of the fourth spacing element in the direction along the optical axis, CT4 is a center thickness of the fourth lens on the optical axis, R7 is a radius of curvature of an object-side surface of the fourth lens, and D4s is an outer diameter of the object-side surface of the fourth spacing element.

In an implementation, the optical imaging lens assembly may satisfy: $16.0 < R7/(EP23+CT3) < 55.0$, where R7 is a radius of curvature of an object-side surface of the fourth lens, EP23 is the spacing distance between the image-side surface of the second spacing element and the object-side surface of the third spacing element in the direction along the optical axis, and CT3 is a center thickness of the third lens on the optical axis.

In an implementation, the at least one spacing element further includes a fifth spacing element disposed on an image side of the fifth lens and partially in contact with an image-side surface of the fifth lens, the optical imaging lens assembly may satisfy: $0.5 < EP45/CT5+|R10|/(D5s-d5s) < 1.5$, where EP45 is a spacing distance between an image-side surface of the fourth spacing element and an object-side surface of the fifth spacing element in the direction along the optical axis, CT5 is a center thickness of the fifth lens on the optical axis, R10 is a radius of curvature of the image-side surface of the fifth lens, D5s is an outer diameter of an object-side surface of the fifth spacing element, and d5s is an inner diameter of the object-side surface of the fifth spacing element.

In an implementation, the optical imaging lens assembly may satisfy: $5.0 < |f6|/(D5m-d5m)+(R11+R12)/CP5 < 7.5$, where f6 is an effective focal length of the sixth lens, D5m is an outer diameter of an image-side surface of the fifth spacing element, d5m is an inner diameter of the image-side surface of the fifth spacing element, R11 is a radius of curvature of an object-side surface of the sixth lens, R12 is a radius of curvature of an image-side surface of the sixth lens, and CP5 is a maximum thickness of the fifth spacing element.

In an implementation, the optical imaging lens assembly may satisfy: $5.5 < L/(Tan(Semi-FOV) \times (D0m-d0m)) < 7.5$, where L is a distance from the object-side end of the lens barrel to an image-side end of the lens barrel on the optical axis, Semi-FOV is half of a maximum field-of-view of the optical imaging lens assembly, D0m is an outer diameter of the image-side end of the lens barrel, and d0m is an inner diameter of the image-side end of the lens barrel.

BRIEF DESCRIPTION OF THE DRAWINGS

Other features, objectives, and advantages of the present disclosure will become more apparent from the following detailed description of the non-limiting embodiments with reference to the accompanying drawings:

FIGS. 2A-2D respectively illustrate a longitudinal aberration curve, an astigmatic curve, a distortion curve and a lateral color curve of the optical imaging lens assembly in Embodiment 1;

FIGS. 4A-4D respectively illustrate a longitudinal aberration curve, an astigmatic curve, a distortion curve and a lateral color curve of the optical imaging lens assembly in Embodiment 2;

FIGS. 8A-8D respectively illustrate a longitudinal aberration curve, an astigmatic curve, a distortion curve and a lateral color curve of the optical imaging lens assembly in Embodiment 4;

DETAILED DESCRIPTION OF EMBODIMENTS

Figure 1A:
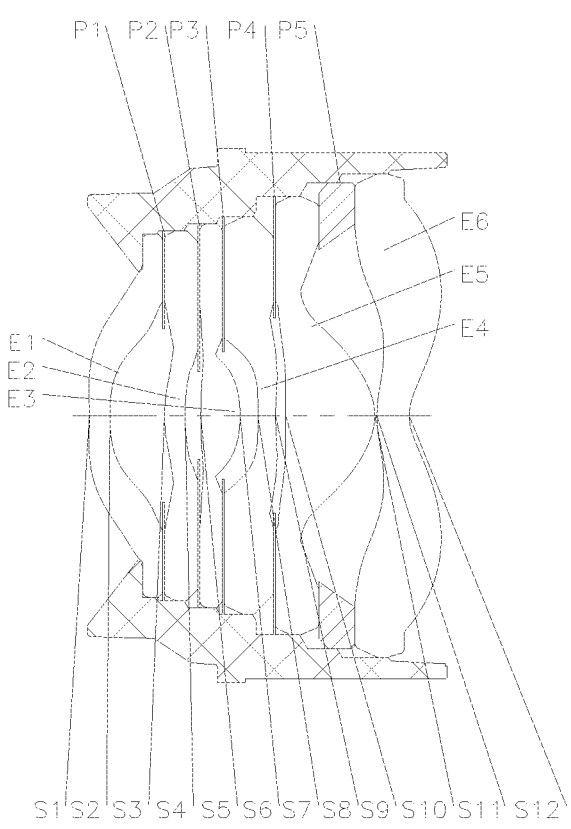
FIG. 1A and FIG. 1B are schematic structural diagrams of an optical imaging lens assembly in two implementations in Embodiment 1.

For a better understanding of the present disclosure, various aspects of the present disclosure will be described in more detail with reference to the accompanying drawings. It should be understood that the detailed description is merely an illustration for the exemplary implementations of the present disclosure, rather than a limitation to the scope of the present disclosure in any way. Throughout the specification, the same reference numerals designate the same elements. The expression "and/or" includes any and all combinations of one or more of the associated listed items.

It should be noted that, in the specification, the expressions such as "first," "second" and "third" are only used to distinguish one feature from another, rather than represent any limitations to the features. Thus, the first lens discussed below may alternatively be referred to as the second lens or the third lens, and the first spacing element may alternatively be referred to as the second spacing element or the third spacing element without departing from the teachings of the present disclosure.

In the accompanying drawings, the thicknesses, sizes and shapes of the lenses are slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale. It should be understood that the thicknesses, sizes and shapes of the spacing element and lens barrel are also slightly exaggerated in the accompanying drawings for the convenience of explanation.

Herein, a paraxial area refers to an area near an optical axis. If a lens surface is a convex surface and the position of the convex surface is not defined, it represents that the lens surface is a convex surface at least at the paraxial area. If the lens surface is a concave surface and the position of the concave surface is not defined, it represents that the lens surface is a concave surface at least in the paraxial area. In each lens, a surface closest to a photographed object is referred to as the object-side surface of the lens, and a surface closest to an image plane is referred to as the image-side surface of the lens. It should be understood that a surface of each spacing element closest to the photographed object is referred to as the object-side surface of the spacing element, and a surface of each spacing element closest to the image plane is referred to as the image-side surface of the spacing element. A surface of the lens barrel closest to the photographed object is referred to as an object-side end of the lens barrel, and a surface of the lens barrel closest to the image plane is referred to as an image-side end of the lens barrel.

It should be further understood that the terms "comprise," "comprising," "having," "include" and/or "including," when used in the specification, specify the presence of stated features, elements and/or components, but do not exclude the presence or addition of one or more other features, elements, components and/or combinations thereof. In addition, expressions such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (e.g., those defined in commonly used dictionaries) should be interpreted as having meaning that is consistent with their meaning in the context of the relevant art and will not be interpreted in an idealized or overly formal sense unless expressly so defined herein.

It should be noted that the embodiments in the present disclosure and the features in the embodiments may be combined with each other on a non-conflict basis. The following embodiments express only several implementations of the present disclosure, and their descriptions are more specific and detailed, but they are not to be construed as a limitation to the scope of patent of the present disclosure. It should be noted that, for those of ordinary skill in the art, without departing from the concept of the present disclosure, a number of deformations and improvements can be made, which all fall within the scope of protection of the present disclosure. For example, a lens group (i.e., first lens to sixth lens), a lens barrel structure and spacing elements in each embodiment of the present disclosure may be combined with each other in any way, and it is not limited that the lens group in an embodiment may only be combined with the lens barrel structure, the spacing elements, etc. in that embodiment. The present disclosure will be described in detail below with reference to the accompanying drawings and in conjunction with the embodiments.

Features, principles and other aspects of the present disclosure are described below in detail.

An optical imaging lens assembly according to exemplary implementations of the present disclosure may include six lenses having refractive powers, namely a first lens, a second lens, a third lens, a fourth lens, a fifth lens and a sixth lens. These six lenses are arranged sequentially along an optical axis from an object side to an image side. There may be a spacing distance between any adjacent two lenses in the first lens to the sixth lens.

According to the exemplary implementations of the present disclosure, each of the first lens to the sixth lens may have an optical area for optical imaging and a non-optical area extending outwardly from an outer periphery of the optical area. Generally speaking, the optical area is an area of the lens for optical imaging and the non-optical area is a structural area of the lens. During assembling of the optical imaging lens assembly, a spacing element may be arranged at the non-optical area of each lens through a process such as dispensing and bonding, and the lenses may be coupled into the lens barrel respectively. During imaging of the optical imaging lens assembly, the optical areas of the lenses may transmit light from an object to form an optical pathway to form a final optical image. Since the non-optical areas of the lenses after the assembly are accommodated in the lens barrel that cannot transmit light, the non-optical areas are not directly involved in the imaging process of the optical imaging lens assembly. It should be noted that for ease of description, the present disclosure divides the lenses into two parts (i.e., the optical areas and the non-optical areas) for description. However, it should be understood that both the optical area and the non-optical area of a lens may be formed as a whole during manufacturing, rather than being formed into two separate parts.

The optical imaging lens assembly according to the exemplary implementations of the present disclosure may include five spacing elements located between the first lens and the sixth lens, namely, a first spacing element, a second spacing element, a third spacing element, a fourth spacing element and a fifth spacing element. In particular, the optical imaging lens assembly may include the first spacing element located between the first lens and the second lens, which may be in contact with the non-optical area of an image-side surface of the first lens; the second spacing element located between the second lens and the third lens, which may be in contact with the non-optical area of an image-side surface of the second lens; the third spacing element located between the third lens and the fourth lens, which may be in contact with the non-optical area of an image-side surface of the third lens; the fourth spacing element located between the fourth lens and the fifth lens, which may be in contact with the non-optical area of an image-side surface of the fourth lens; and the fifth spacing element located between the fifth lens and the sixth lens, which may be in contact with the non-optical area of an image-side surface of the fifth lens. Exemplarily, the first spacing element may be in contact with the non-optical area of the image-side surface of the first lens and at the same time in contact with the non-optical area of an object-side surface of the second lens. For example, an object-side surface of the first spacing element may be in contact with the non-optical area of the image-side surface of the first lens, and an image-side surface of the first spacing element may be in contact with the non-optical area of the object-side surface of the second lens, and so on, an object-side surface of the fifth spacing element may be in contact with the non-optical area of the image-side surface of the fifth lens, and an image-side surface of the fifth spacing element may be in contact with the non-optical area of an object-side surface of the sixth lens.

Figure 1B:
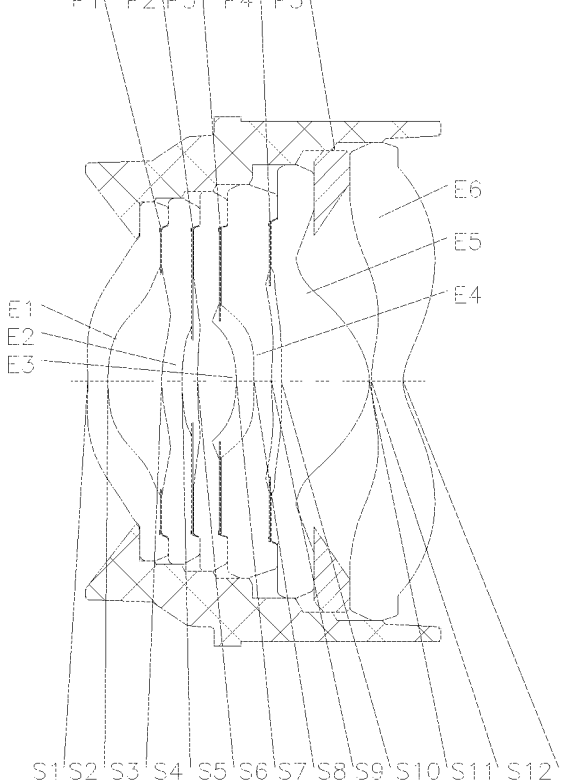

The optical imaging lens assembly according to the exemplary implementations of the present disclosure may include the lens barrel for accommodating the lens group and at least one spacing element. Exemplarily, as shown in FIG. 1A and FIG. 1B, the lens barrel may be a one-piece lens barrel for accommodating the first lens to the sixth lens and the first spacing element to the fifth spacing element.

According to the exemplary implementations of the present disclosure, the spacing elements may include at least one spacer, and by reasonably setting the number, thickness, inner diameter and outer diameter of the spacer, it is conducive to improving assembly of the optical imaging lens assembly, to blocking stray light, and to improving an imaging quality of the optical imaging lens assembly.

In the exemplary implementations, there is an air spacing between any adjacent two lenses in the first lens to the sixth lens along the optical axis, and an air spacing between the fifth lens and the sixth lens is minimum. The optical imaging lens assembly according to the present disclosure may satisfy: $1.5 < R2 \times (D1s-d1s)/|R1 \times (D0s-d0s)| < 5.0$, where R1 is a radius of curvature of an object-side surface of the first lens, R2 is a radius of curvature of the image-side surface of the first lens, D1s is an outer diameter of the object-side surface of the first spacing element, d1s is an inner diameter of the object-side surface of the first spacing element, D0s is an outer diameter of the object-side end of the lens barrel, and d0s is an inner diameter of the object-side end of the lens barrel. In the present disclosure, by reasonably arranging the six lenses, the air spacing between adjacent lenses, the at least one spacing element, and the lens barrel, and by satisfy $1.5 < R2 \times (D1s-d1s)/|R1 \times (D0s-d0s)| < 5.0$, the optical imaging lens assembly may reduce non-imaging light reflected by the first spacing element when large-angle incident light passes through the first lens on the basis of a good imaging effect, thereby reducing the generation of stray light and improving the imaging quality.

In the exemplary implementations, the optical imaging lens assembly according to the present disclosure may satisfy: $4.5 < f2/(d1m-d2s) \leq 8.0$, where f2 is an effective focal length of the second lens, d1m is an inner diameter of the image-side surface of the first spacing element, and d2s is an inner diameter of an object-side surface of the second spacing element. Satisfying $4.5 < f2/(d1m-d2s) \leq 8.0$, i.e., controlling a ratio of the effective focal length of the second lens to a difference between the inner diameter of the first spacing element and the inner diameter of the second spacing element, it may be ensured that a loss of the amount of light transmission is in a reasonable range when light passes through the first spacing element, the second lens and the second spacing element, which is conducive to improving an imaging index of the overall lens assembly.

In the exemplary implementations, the optical imaging lens assembly according to the present disclosure may satisfy: $-1.5 < (EP01+T12)/(R1+R2) < -0.5$, where EP01 is a spacing distance from the object-side end of the lens barrel to the object-side surface of the first spacing element in a direction along the optical axis, T12 is an air spacing between the first lens and the second lens on the optical axis, R1 is the radius of curvature of the object-side surface of the first lens, and R2 is the radius of curvature of the image-side surface of the first lens. Satisfying $-1.5 < (EP01+T12)/(R1+R2) < -0.5$, i.e., controlling a ratio relationship among the radius of curvature of each surface of the first lens and related structural dimensions of the first lens in the direction of the optical axis, it may be ensured that the object-side surface of the first lens does not exceed the object-side end of the lens barrel, which is conducive to reducing an appearance damage to the object-side surface of the first lens, and is also conducive to controlling a bending degree of the optical area of the first lens and improving formability of the first lens, and is further conducive to improving processability of the optical imaging lens assembly.

In the exemplary implementations, the optical imaging lens assembly according to the present disclosure may satisfy: $2.0 < R4 \times (D2s-d2s)/(R3 \times (D1m-d1m)) < 4.0$, where R3 is a radius of curvature of the object-side surface of the second lens, R4 is a radius of curvature of the image-side surface of the second lens, D2s is an outer diameter of the object-side surface of the second spacing element, d2s is the inner diameter of the object-side surface of the second spacing element, D1m is an outer diameter of the image-side surface of the first spacing element, and dim is the inner diameter of the image-side surface of the first spacing element. Satisfying $2.0 < R4 \times (D2s-d2s)/(R3-(D1m-d1m)) < 4.0$, i.e., controlling a ratio relationship among the radius of curvature of each surface of the second lens, a difference between the inner diameter and the outer diameter of the first spacing element, and a difference between the inner diameter and the outer diameter of the second spacer element, related dimensions of the first spacing element, the second spacing element and the related second lens may be reasonably designed, which is then conducive to improving assembly stability of the lens assembly, thus improving a product yield.

In the exemplary implementations, the optical imaging lens assembly according to the present disclosure may satisfy: $4.5 < |f3/EP12+f4/EP23| < 11.0$, where f3 is an effective focal length of the third lens, f4 is an effective focal length of the fourth lens, EP12 is a spacing distance between the image-side surface of the first spacing element and the object-side surface of the second spacing element in the direction along the optical axis, and EP23 is a spacing distance between an image-side surface of the second spacing element and an object-side surface of the third spacing element in the direction along the optical axis. Satisfying $4.5 < |f3/EP12+f4/EP23| < 11.0$, i.e., controlling a ratio of the effective focal length of the third lens to the spacing between the first spacing element and the second spacing element, and a ratio of the effective focal length of the fourth lens to the spacing between the second spacing element and the third spacing element, a quality of light may be improved when the light passes through the third lens and the fourth lens, where the light is formed by light passing through the first lens and the second lens, thereby improving the final imaging quality.

In the exemplary implementations, the optical imaging lens assembly according to the present disclosure may satisfy: $6.0 < R4/d2s+R5/d3s < 20.0$, where R4 is a radius of curvature of the image-side surface of the second lens, R5 is a radius of curvature of an object-side surface of the third lens, d2s is the inner diameter of the object-side surface of the second spacing element, and d3s is an inner diameter of the object-side surface of the third spacing element. Satisfying $6.0 < R4/d2s+R5/d3s < 20.0$, i.e., controlling a ratio of the radius of curvature of the second lens to the inner diameter of the object-side surface of the adjacent spacing element, and a ratio of the radius of curvature of the third lens to the inner diameter of the object-side surface of the adjacent spacing element, it may be ensured that the light has sufficient amount of light transmission when passing through the second lens to the third lens, and at the same time it is also conducive to reducing the generation of non-imaging light. This setting of the present disclosure can not only improve an imaging performance of the lens assembly, but also reduce the generation of stray light, and improve the imaging quality of the lens assembly.

In the exemplary implementations, the optical imaging lens assembly according to the present disclosure may satisfy: $-3.0<R6/(EP23+CP3+CT2)<-2.0$, where R6 is a radius of curvature of the image-side surface of the third lens, EP23 is the spacing distance between the image-side surface of the second spacing element and the object-side surface of the third spacing element in the direction along the optical axis, CP3 is a maximum thickness of the third spacing element, and CT2 is a center thickness of the second lens on the optical axis. Satisfying $-3.0<R6/(EP23+CP3+CT2)<-2.0$, i.e., controlling a ratio of the radius of curvature of the image-side surface of the third lens to related axial dimensions, it may be ensured that light may be quickly refracted to the fourth lens after passing through the third lens, which is conducive to reducing an axial dimension of the lens assembly and improving product competitiveness of the lens assembly.

In the exemplary implementations, the optical imaging lens assembly according to the present disclosure may satisfy: $3.5<|f4/(EP34-CT4)+R7/D4s|<12.0$, where f4 is the effective focal length of the fourth lens, EP34 is a spacing distance between an image-side surface of the third spacing element and an object-side surface of the fourth spacing element in the direction along the optical axis, CT4 is a center thickness of the fourth lens on the optical axis, R7 is a radius of curvature of an object-side surface of the fourth lens, and D4s is an outer diameter of the object-side surface of the fourth spacing element. Satisfying $3.5<|f4/(EP34-CT4)+R7/D4s|<12.0$, i.e., controlling a ratio of the effective focal length of the fourth lens to related axial structure dimensions, and a ratio of the radius of curvature of the object-side surface of the fourth lens to the outer diameter of the fourth spacing element, the refraction of light at the fourth lens may be reasonably controlled, and at the same time a structure uniformity of the optical areas (i.e., effective imaging areas) of the two surfaces of the fourth lens may also be effectively improved, thereby improving the imaging quality and processing feasibility of the lens assembly.

In the exemplary implementations, the optical imaging lens assembly according to the present disclosure may satisfy: $4.0<R8/d4s+T45/CP4<11.5$, where R8 is a radius of curvature of the image-side surface of the fourth lens, T45 is an air spacing between the fourth lens and the fifth lens on the optical axis, d4s is an inner diameter of the object-side surface of the fourth spacing element, and CP4 is a maximum thickness of the fourth spacing element. Satisfying $4.0<R8/d4s+T45/CP4<11.5$, i.e., controlling a ratio of the radius of curvature of the image-side surface of the fourth lens to the inner diameter of the object-side surface of the fourth spacing element, and a ratio relationship between axial related dimensions of the fourth lens and the fifth lens, it may be ensured that a transverse (i.e., a direction perpendicular to the optical axis) dimension and an axial dimension between the fourth lens and the fifth lens are in a reasonable design interval, so as to ensure that structural components composed of the fourth lens, the fifth lens, and the fourth spacing element have good structural dimensions for enhancing the overall assembly stability of the optical imaging lens assembly and improving the product yield.

In the exemplary implementations, the optical imaging lens assembly according to the present disclosure may satisfy: $16.0<R7/(EP23+CT3)<55.0$, where R7 is the radius of curvature of the object-side surface of the fourth lens, EP23 is the spacing distance between the image-side surface of the second spacing element and the object-side surface of the third spacing element in the direction along the optical axis, and CT3 is a center thickness of the third lens on the optical axis. Satisfying $16.0<R7/(EP23+CT3)<55.0$, i.e., controlling a ratio of the radius of curvature of the object-side surface of the fourth lens to related axial dimensions of the third lens, it may be ensured that when light propagates to the image-side surface of the fourth lens, where the light is formed by light passing through the third lens and being refracted to the object-side surface of the fourth lens, non-imaging light generated due to reflection in the fourth lens may be minimized, thus reducing the phenomenon of stray light and improving the image quality of the product.

In the exemplary implementations, the optical imaging lens assembly according to the present disclosure may satisfy: $0.5<EP45/CT5+|R10|/(D5s-d5s)<1.5$, where EP45 is a spacing distance between an image-side surface of the fourth spacing element and an object-side surface of the fifth spacing element in the direction along the optical axis, CT5 is a center thickness of the fifth lens on the optical axis, R10 is a radius of curvature of the image-side surface of the fifth lens, D5s is an outer diameter of an object-side surface of the fifth spacing element, and d5s is an inner diameter of the object-side surface of the fifth spacing element. Satisfying $0.5<EP45/CT5+|R10|/(D5s-d5s)<1.5$, i.e., controlling a ratio of an axial dimension of the fourth spacing element and the fifth spacing element to the center thickness of the fifth lens, and a ratio of the radius of curvature of the image-side surface of the fifth lens to a difference between the inner diameter and the outer diameter of the object-side surface of the fifth spacing element, an overall uniformity of the fifth lens and a reasonable design of a shape of the effective imaging area of the image-side surface of the fifth lens may be effectively balanced, so as to ensure an overall processability of the fifth lens and a quality of the light passing through the fifth lens, and improving the overall imaging quality of the lens assembly.

In the exemplary implementations, the optical imaging lens assembly according to the present disclosure may satisfy: $5.0<|f6|/(D5m-d5m)+(R11+R12)/CP5<7.5$, where f6 is an effective focal length of the sixth lens, D5m is an outer diameter of the image-side surface of the fifth spacing element, d5m is an inner diameter of the image-side surface of the fifth spacing element, R11 is a radius of curvature of the object-side surface of the sixth lens, R12 is a radius of curvature of an image-side surface of the sixth lens, and CP5 is a maximum thickness of the fifth spacing element. Satisfying $5.0<|f6|/(D5m-d5m)+(R11+R12)/CP5<7.5$, i.e., controlling a ratio of the effective focal length of the sixth lens to a difference between the inner diameter and the outer diameter of the image-side surface of the fifth spacing element, and a ratio of a sum of the radii of curvature of the two surfaces of the sixth lens to the thickness of the fifth spacing element, it may be effectively ensured that light transmitted through the first lens to the fifth lens may be better converged to each field-of-view after passing through the sixth lens, thus improving the imaging quality.

In the exemplary implementations, the optical imaging lens assembly according to the present disclosure may satisfy: $5.5<L/(Tan(Semi-FOV)\times(D0m-d0m))<7.5$, where L is a distance from the object-side end of the lens barrel to the image-side end of the lens barrel on the optical axis, Semi-FOV is half of a maximum field-of-view of the optical imaging lens assembly, D0m is an outer diameter of the image-side end of the lens barrel, and d0m is an inner diameter of the image-side end of the lens barrel. Satisfying $5.5<L/(Tan(Semi-FOV)\times(D0m-d0m))<7.5$, i.e., reasonably controlling a relationship among the maximum height L of the lens barrel, half of the maximum field-of-view Semi-FOV of the lens assembly and the inner diameter and the outer diameter of the image-side end of the lens barrel, it may be ensured that under the condition that the height of the lens barrel is certain, the incident light has the largest field-of-view, which can not only ensure basic optical requirements of the lens assembly, but also realize a requirement for the minimum axial dimension of the lens assembly, thus improving the product competitiveness of the optical imaging lens assembly.

Figure 10:
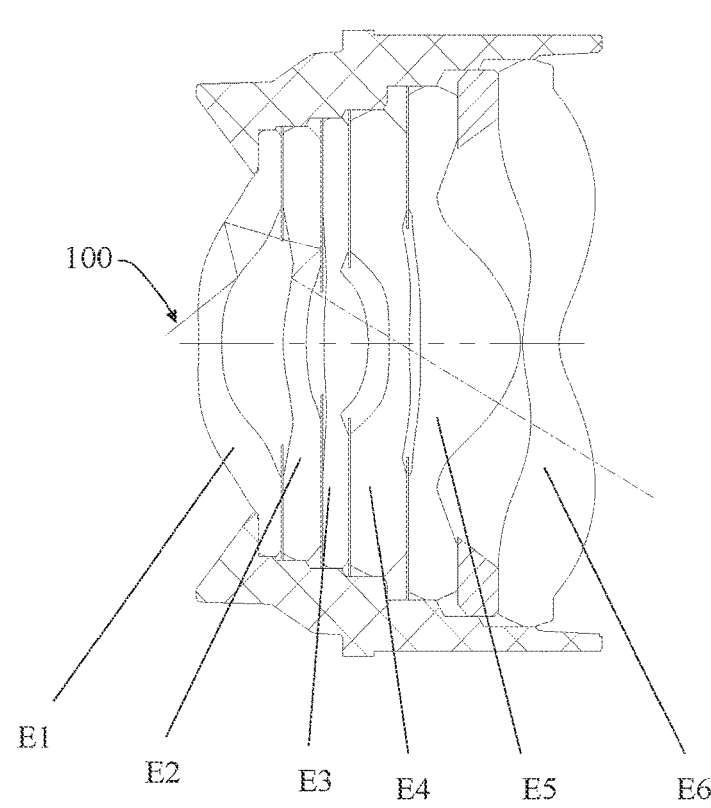
FIG. 10 is a schematic diagram of part of a light path in an optical imaging lens assembly according to an embodiment of the present application.

In the exemplary implementations, the optical imaging lens assembly according to the present disclosure further includes a diaphragm disposed between the second lens and the third lens. Alternatively, the optical imaging lens assembly may further include an optical filter for correcting color deviation and/or a protective glass for protecting a photosensitive element on the image plane. The present disclosure proposes an optical imaging lens assembly having good assembly stability, high yield, less stray light, large field-of-view, miniaturization, and high imaging quality. The optical imaging lens assembly according to the implementations of the present disclosure may use a plurality of lenses, for example, the six lenses. By reasonably distributing the refractive powers, the surface types, the materials of the lenses, the center thicknesses of the lenses and the axial spacing between the lenses, etc., it may effectively converge incident light, reduce a total track length of the optical imaging lens assembly and improve the processability of the optical imaging lens assembly, so that the optical imaging lens assembly is more conducive to production and processing. In the optical imaging lens assembly of the implementations of the present disclosure, by providing spacing elements between adjacent lenses and designing the inner and outer diameters of the spacing elements based on light path, stray light may be effectively blocked and eliminated, thereby improving the imaging quality of the lens assembly. As shown in FIG. 10, part of the light (such as light 100) in the optical imaging lens assembly is as shown in a path schematic diagram.

In the implementations of the present disclosure, at least one of the surfaces of the lenses is an aspheric surface. That is, at least one of the surfaces from the object-side surface of the first lens to the image-side surface of the sixth lens is an aspheric surface. The aspheric lens is characterized in that the curvature continuously changes from the center of the lens to the periphery of the lens. Different from a spherical lens having a constant curvature from the center of the lens to the periphery of the lens, the aspheric lens has a better radius-of-curvature characteristic, and has advantages of improving the distortion aberration and improving the astigmatic aberration. The use of the aspheric lens can eliminate as much as possible the aberrations that occur during the imaging, thereby improving the imaging quality. Alternatively, at least one of the object-side surface and the image-side surface of each of the first lens, the second lens, the third lens, the fourth lens, the fifth lens and the sixth lens is an aspheric lens. Alternatively, the object-side surface and the image-side surface of each of the first lens, the second lens, the third lens, the fourth lens, the fifth lens and the sixth lens are aspheric surfaces.

However, it should be understood by those skilled in the art that the various results and advantages described in the present specification may be obtained by changing the number of the lenses constituting the optical imaging lens assembly without departing from the technical solution claimed by the present disclosure. For example, although the optical imaging lens assembly having six lenses is described as an example in the implementations, the optical imaging lens assembly is not limited to including the six lenses. If desired, the optical imaging lens assembly may alternatively include other numbers of lenses.

Specific embodiments of the optical imaging lens assembly that may be applicable to the implementations are further described below with reference to the accompanying drawings.

Embodiment 1

An optical imaging lens assembly according to Embodiment 1 of the present disclosure is described below with reference to FIG. 1A to FIG. 2D. FIG. 1A and FIG. 1B respectively illustrate the optical imaging lens assembly in two implementations in Embodiment 1.

As shown in FIG. 1A and FIG. 1B, the optical imaging lens assembly includes sequentially from an object side to an image side: a first lens E1, a second lens E2, a diaphragm STO (not shown), a third lens E3, a fourth lens E4, a fifth lens E5, a sixth lens E6, an optical filter (not shown), and an image plane S15 (not shown).

The first lens E1 has a negative refractive power, an object-side surface S1 of the first lens E1 is a concave surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The fourth lens E4 has a negative refractive power, an object-side surface S7 of the fourth lens E4 is a convex surface, and an image-side surface S8 of the fourth lens E4 is a concave surface. The fifth lens E5 has a positive refractive power, an object-side surface S9 of the fifth lens E5 is a convex surface, and an image-side surface S10 of the fifth lens E5 is a convex surface. The sixth lens E6 has a negative refractive power, an object-side surface S11 of the sixth lens E6 is a convex surface, and an image-side surface S12 of the sixth lens E6 is a concave surface. The optical filter has an object-side surface S13 and an image-side surface S14. Light from an object sequentially passes through the surfaces S1-S14 and finally forms an image on the image plane S15.

Table 1 shows a table of basic parameters of the optical imaging lens assembly in Embodiment 1. Here, the units of a radius of curvature, a thickness/distance and a focal length are millimeters (mm).

TABLE 1

| surface number | surface type | radius of curvature | thickness/ distance | material refractive index | material abbe number | focal length | conic coefficient |
|---|---|---|---|---|---|---|---|
| OBJ | spherical | infinite | infinite | | | | |
| S1 | aspheric | −6.2320 | 0.3000 | 1.55 | 55.9 | −4.22 | −5.1093 |
| S2 | aspheric | 3.7227 | 0.7947 | | | | 0.0000 |
| S3 | aspheric | 2.1077 | 0.3000 | 1.62 | 25.9 | 9.20 | −0.1774 |
| S4 | aspheric | 3.1607 | 0.1790 | | | | 1.3490 |
| STO | spherical | infinite | 0.0500 | | | | |
| S5 | aspheric | 6.7365 | 0.5740 | 1.55 | 55.9 | 2.76 | 0.0000 |
| S6 | aspheric | −1.8857 | 0.2598 | | | | 0.0000 |
| S7 | aspheric | 30.1917 | 0.2580 | 1.68 | 19.2 | −5.31 | 0.0000 |
| S8 | aspheric | 3.2093 | 0.1474 | | | | −0.3732 |
| S9 | aspheric | 46.8059 | 1.3000 | 1.55 | 55.9 | 1.48 | −99.0000 |
| S10 | aspheric | −0.8168 | 0.0300 | | | | −1.0091 |
| S11 | aspheric | 1.7204 | 0.4700 | 1.65 | 23.3 | −1.95 | −1.0653 |
| S12 | aspheric | 0.6486 | 0.5185 | | | | −3.7986 |
| S13 | spherical | infinite | 0.1100 | 1.52 | 64.2 | | |
| S14 | spherical | infinite | 0.5836 | | | | |
| S15 | spherical | infinite | | | | | |

In this example, half of a maximum field-of-view Semi-FOV of the optical imaging lens assembly is 65.10.

As shown in FIG. 1A and FIG. 1B, the optical imaging lens assembly may include a lens barrel accommodating the first lens to the sixth lens and a first spacing element to a fifth spacing element. The optical imaging lens assembly may include five spacing elements located between the first lens and the sixth lens, respectively, namely, the first spacing element P1, a second spacing element P2, a third spacing element P3, a fourth spacing element P4 and the fifth spacing element P5.

Table 2 shows a table of basic parameters of each spacing element of the optical imaging lens assembly in the two implementations in Embodiment 1, where the units of each parameter in Table 2 are millimeters (mm).

TABLE 2

| structural parameter | implementation 1 | implementation 2 |
|---|---|---|
| EP01 | 1.094 | 1.102 |
| D1s | 5.400 | 4.527 |
| D1m | 5.400 | 4.527 |
| d1s | 2.530 | 3.162 |
| d1m | 2.530 | 3.162 |
| D0s | 6.448 | 6.448 |
| d0s | 6.091 | 6.091 |
| d2s | 1.279 | 1.217 |
| D2s | 5.600 | 4.527 |
| EP12 | 0.489 | 0.470 |
| EP23 | 0.327 | 0.406 |
| d3s | 1.861 | 1.783 |
| CP3 | 0.028 | 0.018 |
| EP34 | 0.718 | 0.736 |
| D4s | 6.400 | 4.719 |
| d4s | 2.846 | 2.823 |
| CP4 | 0.026 | 0.018 |
| EP45 | 0.637 | 0.543 |
| D5s | 6.490 | 6.490 |
| d5s | 4.842 | 4.305 |

TABLE 2-continued

| structural parameter | implementation 1 | implementation 2 |
|---|---|---|
| D5m | 6.700 | 6.700 |
| d5m | 5.595 | 5.850 |
| CP5 | 0.529 | 0.502 |
| D0m | 7.675 | 7.675 |
| d0m | 7.300 | 7.300 |
| L | 5.250 | 5.250 |

It should be understood that in this example, the structure and parameters of each spacing element in the two implementations are only exemplarily listed, and the specific structure and actual parameters of each spacing element are not explicitly limited. The specific structure and actual parameters of each spacing element may be set in any suitable method in actual production.

In Embodiment 1, both the object-side surface and the image-side surface of any lens in the first lens E1 to the sixth lens E6 are aspheric surfaces, and the surface type x of each aspheric lens may be defined using, but not limited to, the following aspheric formula:

$$x = \frac{ch^2}{1 + \sqrt{1 - (k + 1)c^2 h^2}} + \sum A_i h^i. \tag{1}$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient; and Ai is the correction coefficient of an i-th order of the aspheric surface. Table 3-1 and Table 3-2 below give the high-order coefficients $A_4$, $A_6$, $A_8$, $A_{10}$, $A_{12}$, $A_{14}$, $A_{16}$, $A_{18}$, $A_{20}$, $A_{22}$, $A_{24}$, $A_{26}$, $A_{28}$ and $A_{30}$ applicable to the aspheric surfaces S1 to S12 in Embodiment 1.

TABLE 3-1

| surface number | A4 | A6 | A8 | A10 | A12 | A14 | A16 |
|---|---|---|---|---|---|---|---|
| S1 | 1.2610E+00 | −2.9558E−01 | 6.2804E−02 | −1.1188E−02 | 1.0727E−02 | −3.1834E−03 | 1.0857E−03 |
| S2 | 5.6697E−01 | −2.6101E−01 | 5.4073E−02 | 1.3993E−02 | −6.7513E−03 | −2.9492E−03 | 2.9208E−03 |
| S3 | −8.3952E−02 | −3.5659E−03 | 3.7298E−03 | 2.3770E−04 | −3.3285E−04 | −6.0055E−05 | 4.2517E−05 |
| S4 | 4.3783E−03 | 3.4751E−03 | 1.6853E−03 | 3.7417E−04 | 6.4583E−05 | 7.1823E−06 | 1.2406E−05 |
| S5 | −7.9075E−03 | −1.1145E−04 | 4.8938E−04 | 1.9667E−04 | 9.4809E−06 | −2.2191E−05 | −2.2885E−05 |
| S6 | −1.2732E−01 | −4.3717E−03 | 1.5023E−03 | 1.5341E−03 | 1.0131E−03 | 4.1719E−04 | 1.8044E−04 |
| S7 | −3.5491E−01 | 1.0615E−02 | −9.7671E−04 | 2.1825E−03 | 3.2728E−04 | 2.5209E−04 | −7.1218E−05 |
| S8 | −4.4048E−01 | 8.1424E−02 | −1.7484E−02 | 3.8011E−03 | −5.7829E−04 | 4.6933E−05 | −1.0811E−04 |
| S9 | −1.7209E−01 | 4.7873E−02 | −7.1489E−03 | −9.0017E−04 | 1.9881E−03 | −2.2450E−04 | 4.7316E−04 |
| S10 | 8.0740E−01 | −1.5895E−02 | 5.8646E−02 | −3.5977E−02 | 6.7794E−04 | −1.0223E−03 | 5.4858E−03 |
| S11 | −2.9222E+00 | 7.6525E−01 | −2.0249E−01 | 4.8113E−02 | −2.1234E−02 | 1.2998E−02 | −3.4978E−03 |
| S12 | −1.9348E+00 | 3.5369E−01 | −1.2187E−01 | 4.6264E−02 | −2.1552E−02 | 8.4530E−03 | −4.1255E−03 |

TABLE 3-2

| surface number | A18 | A20 | A22 | A24 | A26 | A28 | A30 |
|---|---|---|---|---|---|---|---|
| S1 | −2.6347E−04 | 2.9702E−04 | −1.0673E−04 | −3.3305E−05 | −5.9120E−05 | −1.5969E−05 | 9.0003E−06 |
| S2 | 5.1057E−04 | −9.2022E−04 | 6.5435E−05 | 1.9979E−04 | −2.4689E−05 | −9.8410E−05 | 2.4685E−05 |
| S3 | 1.4701E−05 | −2.7107E−06 | −6.3839E−06 | −3.6789E−08 | 5.8719E−07 | 1.0054E−06 | −3.8689E−07 |
| S4 | 7.6797E−06 | 6.3116E−06 | −5.8791E−07 | −1.6550E−06 | −2.9907E−06 | −1.7624E−07 | 4.4716E−07 |
| S5 | −1.2725E−05 | −5.6971E−06 | 3.7921E−06 | 1.0873E−06 | 7.4087E−09 | 4.3655E−07 | −2.0535E−07 |
| S6 | 1.8501E−05 | 7.6870E−07 | −2.9747E−05 | −1.5279E−05 | −1.3826E−05 | 9.0477E−07 | 2.0114E−06 |
| S7 | −9.4350E−06 | −1.9995E−05 | 1.5003E−05 | −9.3468E−06 | 3.8550E−06 | −8.3932E−06 | 2.6865E−06 |
| S8 | −1.2164E−04 | 2.4462E−05 | −4.6469E−05 | 3.0152E−05 | −2.9321E−06 | 7.9560E−06 | −2.1592E−06 |
| S9 | −6.0811E−04 | −1.9786E−06 | −1.0659E−04 | 5.5278E−05 | 8.2477E−06 | 1.7960E−05 | −6.2264E−06 |
| S10 | −9.4588E−05 | −3.8583E−04 | −9.8459E−04 | 1.4462E−04 | 1.2101E−04 | 1.0596E−04 | −6.1496E−05 |
| S11 | 3.9853E−04 | 3.4697E−04 | −9.9813E−05 | −2.0152E−04 | −5.0194E−05 | 1.9733E−04 | −8.4348E−05 |
| S12 | 1.6909E−03 | 2.0400E−05 | 9.6834E−04 | 2.6795E−04 | −2.1101E−05 | −6.0733E−05 | −1.4424E−04 |

FIG. 2A illustrates a longitudinal aberration curve of the optical imaging lens assembly according to Embodiment 1, representing deviations of focal points converged by light of different wavelengths after passing through the lens assembly. FIG. 2B illustrates an astigmatic curve of the optical imaging lens assembly according to Embodiment 1, representing a curvature of a tangential image plane and a curvature of a sagittal image plane. FIG. 2C illustrates a distortion curve of the optical imaging lens assembly according to Embodiment 1, representing amounts of distortion corresponding to different image heights. FIG. 2D illustrates a lateral color curve of the optical imaging lens assembly according to Embodiment 1, representing deviations of different image heights on the image plane formed by light passing through the lens assembly. It can be seen from FIGS. 2A-2D that the optical imaging lens assembly given in Embodiment 1 can achieve a good imaging quality.

Embodiment 2

Figure 3A:
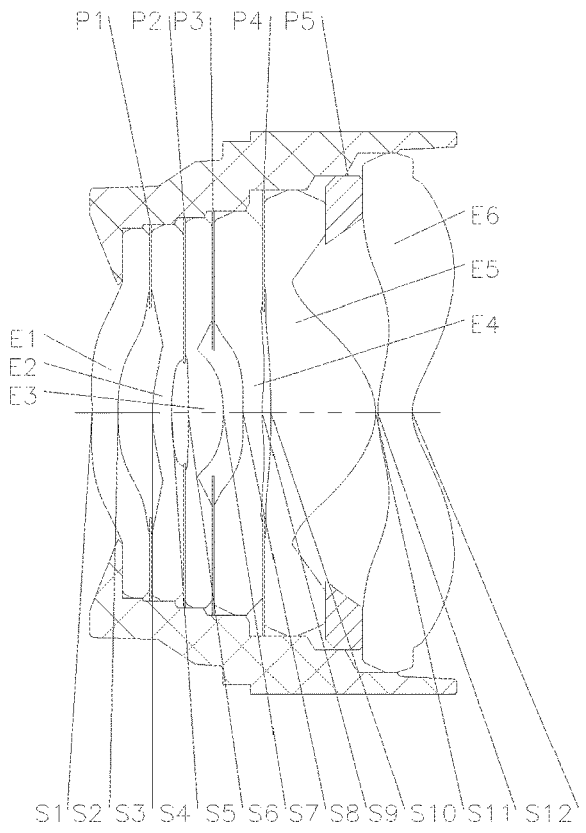
FIG. 3A and FIG. 3B are schematic structural diagrams of an optical imaging lens assembly in two implementations in Embodiment 2.
Figure 3B:
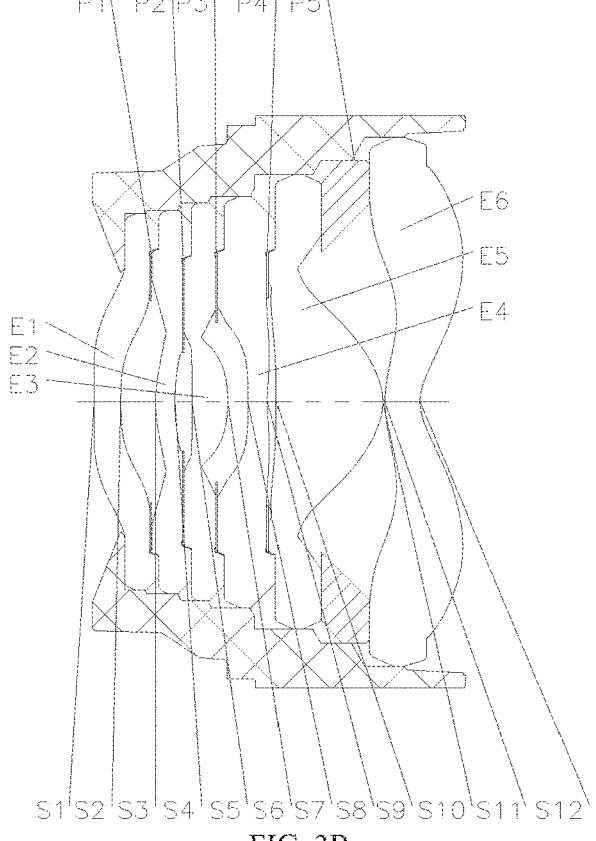

An optical imaging lens assembly according to Embodiment 2 of the present disclosure is described below with reference to FIG. 3A to FIG. 4D. In this embodiment and the following embodiments, for the sake of brevity, some descriptions similar to those in Embodiment 1 will be omitted. FIG. 3A and FIG. 3B respectively illustrate the optical imaging lens assembly in two implementations in Embodiment 2.

As shown in FIG. 3A and FIG. 3B, the optical imaging lens assembly includes sequentially from an object side to an image side: a first lens E1, a second lens E2, a diaphragm STO (not shown), a third lens E3, a fourth lens E4, a fifth lens E5, a sixth lens E6, an optical filter (not shown), and an image plane S15 (not shown).

The first lens E1 has a negative refractive power, an object-side surface S1 of the first lens E1 is a concave surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The fourth lens E4 has a negative refractive power, an object-side surface S7 of the fourth lens E4 is a convex surface, and an image-side surface S8 of the fourth lens E4 is a concave surface. The fifth lens E5 has a positive refractive power, an object-side surface S9 of the fifth lens E5 is a concave surface, and an image-side surface S10 of the fifth lens E5 is a convex surface. The sixth lens E6 has a negative refractive power, an object-side surface S11 of the sixth lens E6 is a convex surface, and an image-side surface S12 of the sixth lens E6 is a concave surface. The optical filter has an object-side surface S13 and an image-side surface S14.

Light from an object sequentially passes through the surfaces S1-S14 and finally forms an image on the image plane S15.

In this example, half of a maximum field-of-view Semi-FOV of the optical imaging lens assembly is 61.8°.

As shown in FIG. 3A and FIG. 3B, the optical imaging lens assembly may include a lens barrel accommodating the first lens to the sixth lens and a first spacing element to a fifth spacing element. The optical imaging lens assembly may include five spacing elements located between the first lens and the sixth lens, respectively, namely, the first spacing element P1, a second spacing element P2, a third spacing element P3, a fourth spacing element P4 and the fifth spacing element P5.

It should be understood that in this example, the structure and parameters of each spacing element in the two implementations are only exemplarily listed, and the specific structure and actual parameters of each spacing element are not explicitly limited. The specific structure and actual parameters of each spacing element may be set in any suitable method in actual production.

Table 4 shows a table of basic parameters of the optical imaging lens assembly in Embodiment 2. Here, the units of a radius of curvature, a thickness/distance and a focal length are millimeters (mm). Table 5 shows a table of basic parameters of each spacing element of the optical imaging lens assembly in the two implementations in Embodiment 2, where the units of each parameter in Table 5 are millimeters (mm). Table 6-1 and Table 6-2 show the high-order coefficients applicable to the aspheric surfaces in Embodiment 2. Here, the surface type of each aspheric surface may be defined using the formula (1) given in Embodiment 1.

TABLE 5

| structural parameter | implementation 1 | implementation 2 |
|---|---|---|
| EP01 | 0.854 | 0.817 |
| D1s | 5.200 | 4.254 |
| D1m | 5.200 | 4.254 |
| d1s | 3.013 | 2.844 |
| d1m | 3.013 | 2.844 |
| D0s | 6.354 | 6.354 |
| d0s | 5.958 | 5.958 |
| d2s | 1.441 | 1.390 |
| D2s | 5.500 | 4.054 |
| EP12 | 0.457 | 0.454 |
| EP23 | 0.385 | 0.467 |
| d3s | 1.817 | 2.252 |
| CP3 | 0.028 | 0.018 |
| EP34 | 0.696 | 0.711 |
| D4s | 6.322 | 4.232 |
| d4s | 2.928 | 2.940 |
| CP4 | 0.028 | 0.018 |
| EP45 | 0.866 | 0.640 |
| D5s | 6.445 | 6.156 |
| d5s | 4.842 | 4.230 |
| D5m | 6.564 | 6.547 |
| d5m | 5.424 | 5.595 |
| CP5 | 0.526 | 0.679 |
| D0m | 7.521 | 7.521 |
| d0m | 7.126 | 7.126 |
| L | 5.230 | 5.230 |

TABLE 4

| surface number | surface type | radius of curvature | thickness/ distance | material refractive index | abbe number | focal length | conic coefficient |
|---|---|---|---|---|---|---|---|
| OBJ | spherical | infinite | infinite | | | | |
| S1 | aspheric | −8.3814 | 0.3754 | 1.55 | 55.9 | −6.48 | 0.0000 |
| S2 | aspheric | 6.2292 | 0.4916 | | | | 0.0000 |
| S3 | aspheric | 2.3586 | 0.2700 | 1.62 | 25.9 | 10.71 | 0.0000 |
| S4 | aspheric | 3.4979 | 0.1659 | | | | 0.0000 |
| STO | spherical | infinite | 0.0714 | | | | |
| S5 | aspheric | 30.6729 | 0.5065 | 1.55 | 55.9 | 3.43 | 0.0000 |
| S6 | aspheric | −1.9863 | 0.2825 | | | | 0.0000 |
| S7 | aspheric | 16.3330 | 0.2750 | 1.68 | 19.2 | −5.96 | 0.0000 |
| S8 | aspheric | 3.2189 | 0.1202 | | | | 0.0000 |
| S9 | aspheric | −37.8251 | 1.4950 | 1.55 | 55.9 | 1.58 | 0.0000 |
| S10 | aspheric | −0.8582 | 0.0300 | | | | −1.3532 |
| S11 | aspheric | 1.5831 | 0.4950 | 1.64 | 23.9 | −2.22 | −12.9079 |
| S12 | aspheric | 0.6575 | 0.6513 | | | | −3.6170 |
| S13 | spherical | infinite | 0.1100 | 1.52 | 64.2 | | |
| S14 | spherical | infinite | 0.5394 | | | | |
| S15 | spherical | infinite | | | | | |

TABLE 6-1

| surface number | A4 | A6 | A8 | A10 | A12 |
|---|---|---|---|---|---|
| S1 | 7.3845E−01 | −1.4253E−01 | 1.6146E−02 | −5.4841E−03 | 3.3102E−03 |
| S2 | 3.3455E−01 | −1.3216E−01 | 1.9590E−02 | 5.1195E−03 | −1.1981E−03 |
| S3 | −4.7379E−02 | −3.8865E−03 | 2.9817E−03 | 4.6125E−04 | −1.6143E−04 |
| S4 | 1.0935E−02 | 3.4105E−03 | 1.6473E−03 | 4.5971E−04 | 1.4065E−04 |
| S5 | −1.5588E−02 | −5.9922E−05 | 5.1395E−04 | 1.2854E−04 | −1.0615E−06 |
| S6 | −1.2069E−01 | −4.4054E−03 | 2.6012E−04 | 9.5875E−04 | 5.2183E−04 |
| S7 | −3.1008E−01 | 2.7107E−02 | −3.0635E−03 | −3.3153E−05 | −8.5462E−05 |
| S8 | −3.9970E−01 | 8.1733E−02 | −1.9361E−02 | 2.8992E−03 | −4.7147E−04 |
| S9 | −6.2833E−02 | 3.4325E−02 | −5.6888E−03 | 2.7424E−04 | −9.8174E−05 |
| S10 | 2.7179E−01 | 4.0261E−03 | 4.7792E−02 | −1.7003E−02 | 4.0038E−04 |
| S11 | −1.1550E+00 | 3.0316E−01 | −2.1110E−02 | −2.2558E−02 | 6.8448E−03 |
| S12 | −1.7980E+00 | 2.8357E−01 | −7.4269E−02 | 2.4778E−02 | −1.3178E−02 |

TABLE 6-2

| surface number | A14 | A16 | A18 | A20 | A22 |
|---|---|---|---|---|---|
| S1 | −5.0341E−04 | 1.8556E−04 | −1.0292E−04 | −2.4282E−05 | 0.0000E+00 |
| S2 | −1.3059E−03 | 5.2707E−04 | 1.8158E−04 | −1.2788E−04 | −4.6106E−06 |
| S3 | −6.7638E−05 | 2.7747E−06 | 8.5602E−06 | −1.6349E−09 | 0.0000E+00 |
| S4 | 3.7590E−05 | 1.8245E−05 | 2.7817E−06 | 2.0340E−06 | 0.0000E+00 |
| S5 | −2.2878E−05 | −1.2130E−05 | −3.7911E−06 | −1.1594E−07 | 0.0000E+00 |
| S6 | 1.9863E−04 | 4.2055E−05 | −8.1846E−06 | −9.0617E−06 | 0.0000E+00 |
| S7 | 1.3266E−04 | −1.6254E−05 | 4.4126E−06 | 9.5897E−06 | 0.0000E+00 |
| S8 | 1.8078E−04 | −1.0733E−04 | 7.5470E−05 | −1.4313E−05 | 0.0000E+00 |
| S9 | −4.2271E−04 | 2.1251E−04 | 3.6795E−05 | −2.0082E−05 | 0.0000E+00 |
| S10 | −2.3731E−03 | 5.2174E−04 | 1.3693E−04 | 1.9247E−04 | 0.0000E+00 |
| S11 | −2.3312E−03 | 3.8839E−03 | −2.2681E−03 | 5.9638E−04 | 0.0000E+00 |
| S12 | −5.9294E−04 | 8.6737E−04 | 3.0980E−04 | 8.2956E−04 | 0.0000E+00 |

FIG. 4A illustrates a longitudinal aberration curve of the optical imaging lens assembly according to Embodiment 2, representing deviations of focal points converged by light of different wavelengths after passing through the lens assembly. FIG. 4B illustrates an astigmatic curve of the optical imaging lens assembly according to Embodiment 2, representing a curvature of a tangential image plane and a curvature of a sagittal image plane. FIG. 4C illustrates a distortion curve of the optical imaging lens assembly according to Embodiment 2, representing amounts of distortion corresponding to different image heights. FIG. 4D illustrates a lateral color curve of the optical imaging lens assembly according to Embodiment 2, representing deviations of different image heights on the image plane formed by light passing through the lens assembly. It can be seen from FIGS. 4A-4D that the optical imaging lens assembly given in Embodiment 2 can achieve a good imaging quality.

Embodiment 3

Figures 5A, 5B:
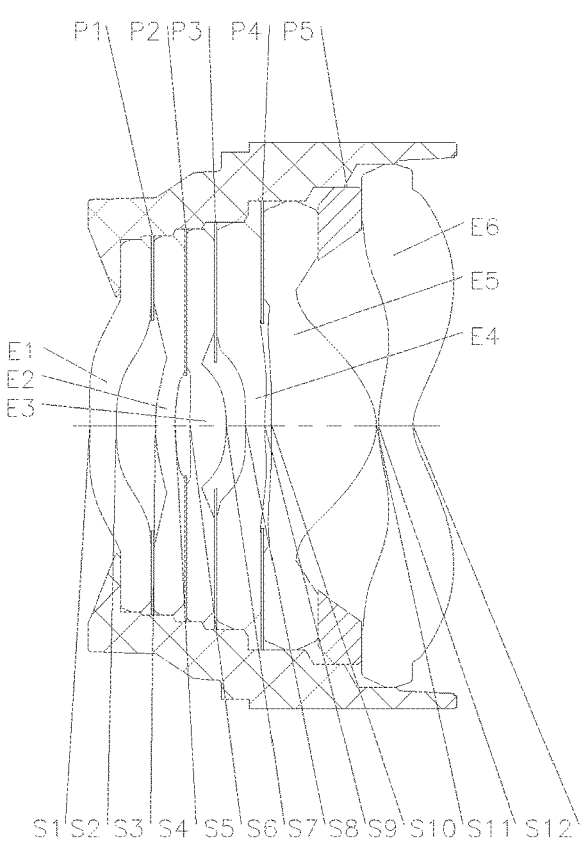
FIG. 5A and FIG. 5B are schematic structural diagrams of an optical imaging lens assembly in two implementations in Embodiment 3.

An optical imaging lens assembly according to Embodiment 3 of the present disclosure is described below with reference to FIG. 5A to FIG. 6D. FIG. 5A and FIG. 5B respectively illustrate the optical imaging lens assembly in two implementations in Embodiment 3.

As shown in FIG. 5A and FIG. 5B, the optical imaging lens assembly includes sequentially from an object side to an image side: a first lens E1, a second lens E2, a diaphragm STO (not shown), a third lens E3, a fourth lens E4, a fifth lens E5, a sixth lens E6, an optical filter (not shown), and an image plane S15 (not shown).

The first lens E1 has a negative refractive power, an object-side surface S1 of the first lens E1 is a concave surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The fourth lens E4 has a negative refractive power, an object-side surface S7 of the fourth lens E4 is a convex surface, and an image-side surface S8 of the fourth lens E4 is a concave surface. The fifth lens E5 has a positive refractive power, an object-side surface S9 of the fifth lens E5 is a convex surface, and an image-side surface S10 of the fifth lens E5 is a convex surface. The sixth lens E6 has a negative refractive power, an object-side surface S11 of the sixth lens E6 is a convex surface, and an image-side surface S12 of the sixth lens E6 is a concave surface. The optical filter has an object-side surface S13 and an image-side surface S14. Light from an object sequentially passes through the surfaces S1-S14 and finally forms an image on the image plane S15.

In this example, half of a maximum field-of-view Semi-FOV of the optical imaging lens assembly is 63.4°.

As shown in FIG. 5A and FIG. 5B, the optical imaging lens assembly may include a lens barrel accommodating the first lens to the sixth lens and a first spacing element to a fifth spacing element. The optical imaging lens assembly may include five spacing elements located between the first lens and the sixth lens, respectively, namely, the first spacing element P1, a second spacing element P2, a third spacing element P3, a fourth spacing element P4 and the fifth spacing element P5.

It should be understood that in this example, the structure and parameters of each spacing element in the two implementations are only exemplarily listed, and the specific structure and actual parameters of each spacing element are not explicitly limited. The specific structure and actual parameters of each spacing element may be set in any suitable method in actual production.

Table 7 shows a table of basic parameters of the optical imaging lens assembly in Embodiment 3. Here, the units of a radius of curvature, a thickness/distance and a focal length are millimeters (mm). Table 8 shows a table of basic parameters of each spacing element of the optical imaging lens assembly in the two implementations in Embodiment 3, where the units of each parameter in Table 8 are millimeters (mm). Table 9-1 and Table 9-2 show the high-order coefficients applicable to the aspheric surfaces in Embodiment 3. Here, the surface type of each aspheric surface may be defined using the formula (1) given in Embodiment 1.

TABLE 7

| surface number | surface type | radius of curvature | thickness/ distance | refractive index | abbe number | focal length | conic coefficient |
|---|---|---|---|---|---|---|---|
| | | | | material | | | |
| OBJ | spherical | infinite | infinite | | | | |
| S1 | aspheric | −7.6313 | 0.3750 | 1.55 | 55.9 | −5.44 | 0.0000 |
| S2 | aspheric | 4.9572 | 0.5588 | | | | 0.0000 |
| S3 | aspheric | 2.2039 | 0.2802 | 1.62 | 25.9 | 9.37 | 0.0000 |
| S4 | aspheric | 3.3794 | 0.1493 | | | | 0.0000 |
| STO | spherical | infinite | 0.0664 | | | | |
| S5 | aspheric | 17.1959 | 0.5147 | 1.55 | 55.9 | 3.39 | 0.0000 |
| S6 | aspheric | −2.0511 | 0.2735 | | | | 0.0000 |
| S7 | aspheric | 49.7011 | 0.2750 | 1.68 | 19.2 | −5.20 | 0.0000 |
| S8 | aspheric | 3.2900 | 0.0925 | | | | −0.6188 |
| S9 | aspheric | 37.8220 | 1.4900 | 1.55 | 55.9 | 1.47 | 0.0000 |
| S10 | aspheric | −0.8102 | 0.0300 | | | | −1.4154 |
| S11 | aspheric | 1.6410 | 0.4950 | 1.65 | 23.5 | −2.02 | −26.3543 |
| S12 | aspheric | 0.6409 | 0.6402 | | | | −4.1868 |
| S13 | spherical | infinite | 0.1100 | 1.52 | 64.2 | | |
| S14 | spherical | infinite | 0.5283 | | | | |
| S15 | spherical | infinite | | | | | |

TABLE 8

| structural parameter | implementation 1 | implementation 2 |
|---|---|---|
| EP01 | 0.907 | 0.859 |
| D1s | 5.322 | 4.202 |
| D1m | 5.322 | 4.202 |
| d1s | 3.013 | 2.658 |
| d1m | 3.013 | 2.658 |
| D0s | 6.358 | 6.358 |
| d0s | 5.895 | 5.895 |
| d2s | 1.441 | 1.488 |
| D2s | 5.564 | 4.035 |
| EP12 | 0.446 | 0.520 |
| EP23 | 0.397 | 0.453 |
| d3s | 1.817 | 1.896 |
| CP3 | 0.028 | 0.018 |
| EP34 | 0.641 | 0.641 |
| D4s | 6.325 | 4.650 |
| d4s | 2.928 | 2.885 |
| CP4 | 0.028 | 0.018 |
| EP45 | 0.766 | 0.574 |
| D5s | 6.267 | 5.845 |
| d5s | 4.699 | 4.557 |
| D5m | 6.542 | 6.489 |
| d5m | 5.595 | 5.585 |
| CP5 | 0.629 | 0.729 |
| D0m | 7.552 | 7.552 |
| d0m | 7.102 | 7.102 |
| L | 5.200 | 5.200 |

TABLE 9-1

| surface number | A4 | A6 | A8 | A10 | A12 | A14 |
|---|---|---|---|---|---|---|
| S1 | 8.3404E−01 | −1.6803E−01 | 2.1999E−02 | −5.7578E−03 | 4.1996E−03 | −1.0724E−03 |
| S2 | 3.7230E−01 | −1.4280E−01 | 1.7951E−02 | 7.7758E−03 | −1.4728E−03 | −1.8157E−03 |
| S3 | −4.5298E−02 | −4.6882E−03 | 2.9281E−03 | 5.0409E−04 | −1.8366E−04 | −9.0547E−05 |
| S4 | 1.0925E−02 | 3.1199E−03 | 1.4404E−03 | 4.1915E−04 | 8.7600E−05 | 2.7291E−05 |

TABLE 9-1-continued

| surface number | A4 | A6 | A8 | A10 | A12 | A14 |
|---|---|---|---|---|---|---|
| S5 | −1.3236E−02 | 4.5501E−05 | 5.8559E−04 | 1.4936E−04 | 4.4008E−06 | −2.5497E−05 |
| S6 | −1.2851E−01 | −4.7191E−03 | 8.2173E−04 | 1.2394E−03 | 7.0559E−04 | 2.8096E−04 |
| S7 | −3.1646E−01 | 1.8966E−02 | −1.7008E−03 | −1.8277E−04 | −1.0558E−05 | 1.4902E−04 |
| S8 | −4.1913E−01 | 8.4741E−02 | −2.0560E−02 | 2.7080E−03 | −2.0096E−04 | 2.5959E−04 |
| S9 | −1.0425E−01 | 4.9530E−02 | −1.1276E−02 | 2.3502E−03 | −5.2460E−04 | 1.9518E−05 |
| S10 | 3.4854E−01 | 1.8794E−02 | 4.7649E−02 | −2.3502E−02 | 5.0907E−04 | −1.8447E−03 |
| S11 | −9.1108E−01 | 2.2080E−01 | 1.8970E−02 | −4.1111E−02 | 1.3913E−02 | −5.6723E−03 |
| S12 | −1.6527E+00 | 2.3250E−01 | −5.1619E−02 | 1.6210E−02 | −7.0184E−03 | −2.8783E−03 |

TABLE 9-2

| surface number | A16 | A18 | A20 | A22 | A24 | A26 |
|---|---|---|---|---|---|---|
| S1 | 1.1282E−04 | −1.6147E−04 | 2.4078E−05 | 3.5377E−06 | 3.7206E−05 | −9.8945E−06 |
| S2 | 5.1657E−04 | 4.0079E−04 | −1.9084E−04 | −9.3162E−06 | −6.6339E−07 | 0.0000E+00 |
| S3 | 1.8086E−05 | 1.3069E−05 | 3.6278E−06 | −4.6688E−06 | 2.7319E−06 | 0.0000E+00 |
| S4 | 1.0750E−05 | 8.4477E−06 | −8.8295E−07 | −2.5163E−06 | −3.5335E−06 | 0.0000E+00 |
| S5 | −1.2665E−05 | −5.2810E−06 | 1.6653E−07 | 0.0000E+00 | 0.0000E+00 | 0.0000E+00 |
| S6 | 7.1428E−05 | −4.1087E−07 | −1.5151E−05 | −1.0078E−05 | −5.2702E−06 | 0.0000E+00 |
| S7 | −1.0797E−05 | −6.8963E−06 | 4.1238E−06 | 4.3539E−06 | 2.4628E−06 | 0.0000E+00 |
| S8 | −1.0995E−04 | 9.4140E−05 | −1.9156E−05 | 0.0000E+00 | 0.0000E+00 | 0.0000E+00 |
| S9 | 2.8456E−04 | −7.7564E−05 | −5.9909E−05 | −9.6581E−11 | 0.0000E+00 | 0.0000E+00 |
| S10 | 1.1856E−03 | 6.9875E−04 | −2.0666E−05 | 3.5958E−05 | −1.7293E−04 | 0.0000E+00 |
| S11 | 5.3151E−03 | −3.4063E−03 | 1.4291E−03 | −6.5490E−04 | 3.4948E−04 | 0.0000E+00 |
| S12 | 2.6717E−04 | −3.6193E−04 | 1.3239E−03 | 0.0000E+00 | 0.0000E+00 | 0.0000E+00 |

Figures 6A, 6B, 6C, 6D:
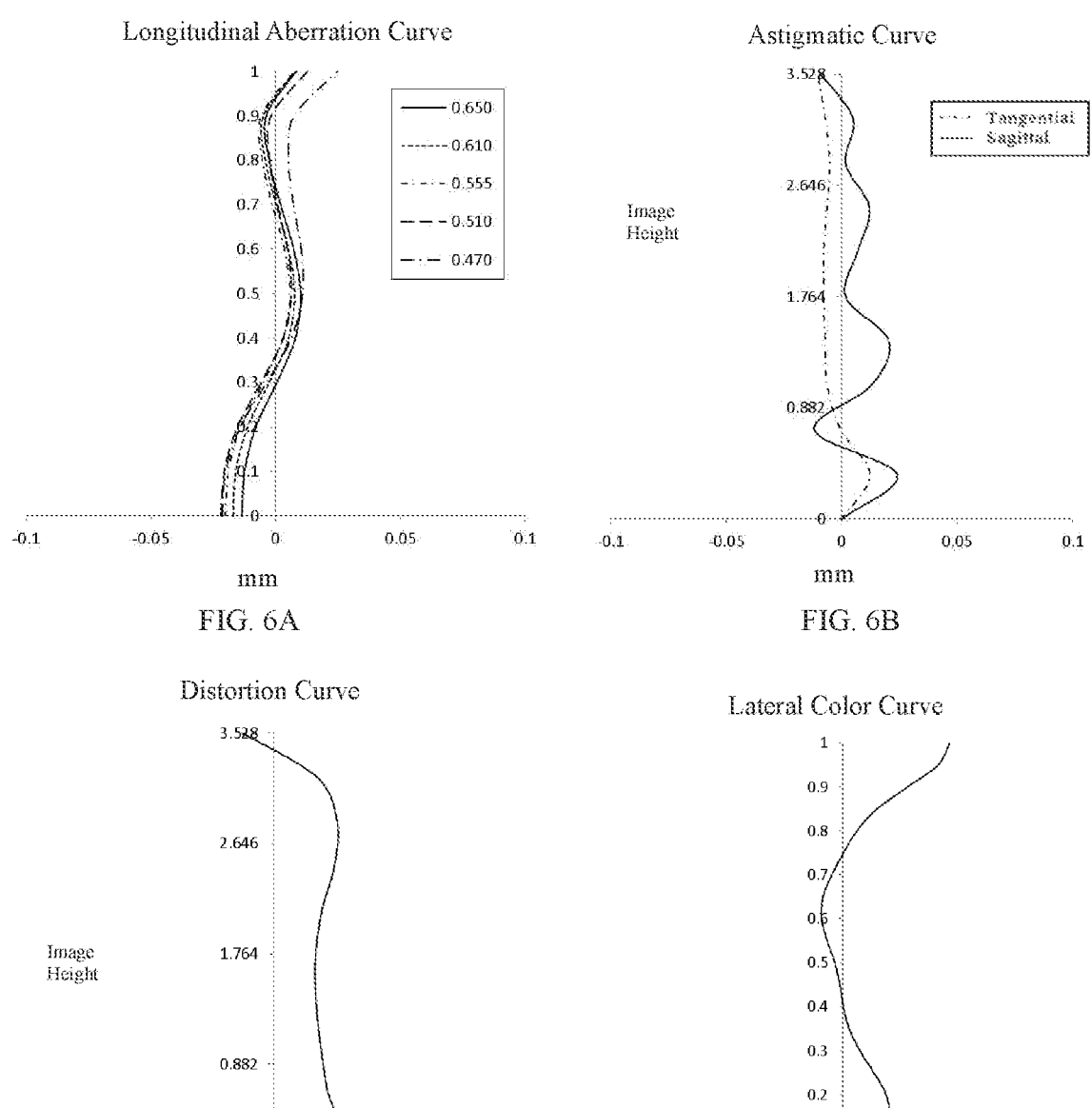
FIGS. 6A-6D respectively illustrate a longitudinal aberration curve, an astigmatic curve, a distortion curve and a lateral color curve of the optical imaging lens assembly in Embodiment 3.

FIG. 6A illustrates a longitudinal aberration curve of the optical imaging lens assembly according to Embodiment 3, representing deviations of focal points converged by light of different wavelengths after passing through the lens assembly. FIG. 6B illustrates an astigmatic curve of the optical imaging lens assembly according to Embodiment 3, representing a curvature of a tangential image plane and a curvature of a sagittal image plane. FIG. 6C illustrates a distortion curve of the optical imaging lens assembly according to Embodiment 3, representing amounts of distortion corresponding to different image heights. FIG. 6D illustrates a lateral color curve of the optical imaging lens assembly according to Embodiment 3, representing deviations of different image heights on the image plane formed by light passing through the lens assembly. It can be seen from FIGS. 6A-6D that the optical imaging lens assembly given in Embodiment 3 can achieve a good imaging quality.

Embodiment 4

Figure 7A:
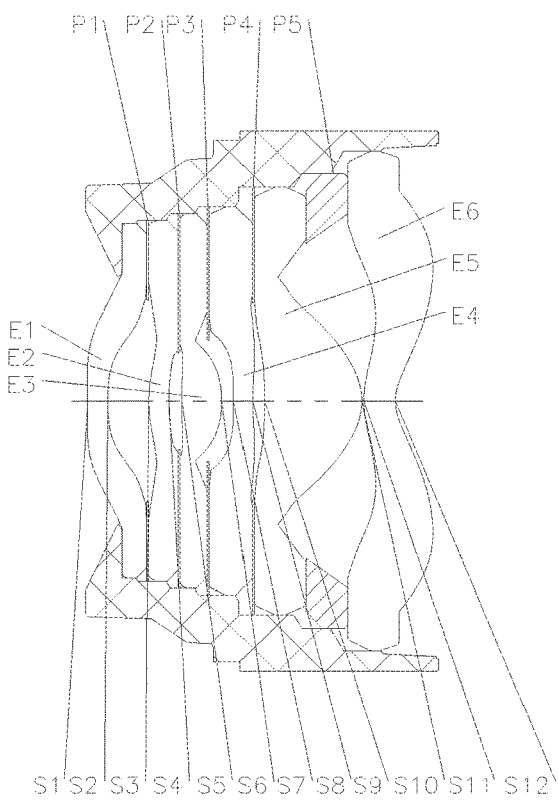
FIG. 7A and FIG. 7B are schematic structural diagrams of an optical imaging lens assembly in two implementations in Embodiment 4.
Figure 7B:
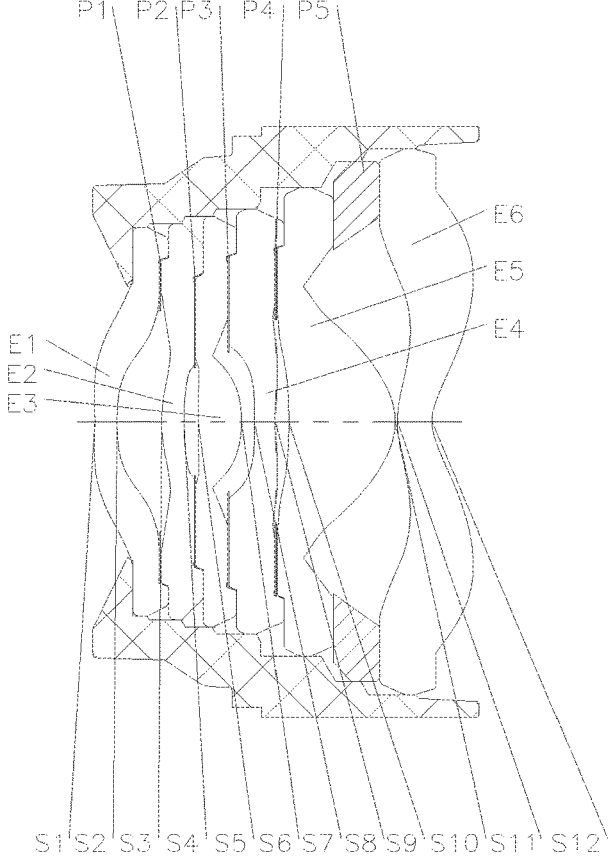
Figure 9:
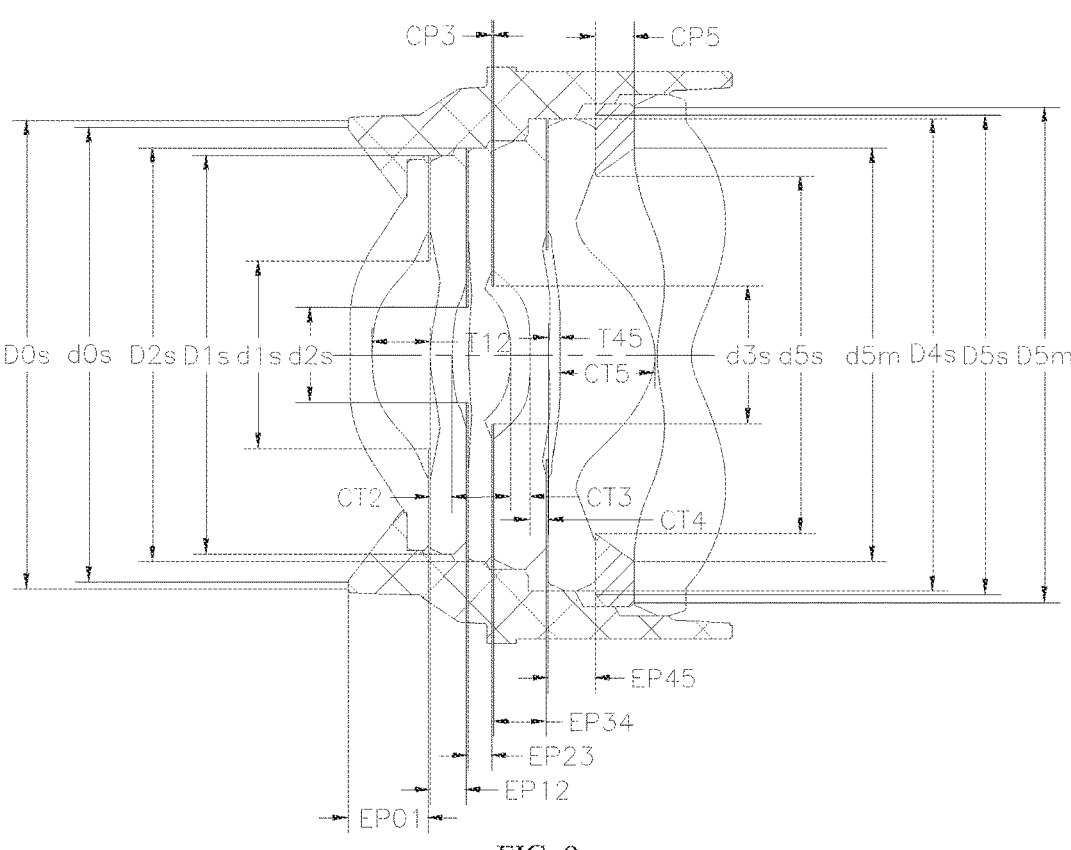
FIG. 9 is a schematic diagram of some parameters of an optical imaging lens assembly according to an embodiment of the present disclosure.

An optical imaging lens assembly according to Embodiment 4 of the present disclosure is described below with reference to FIG. 7A to FIG. 8D. FIG. 7A and FIG. 7B respectively illustrate the optical imaging lens assembly in two implementations in Embodiment 4.

As shown in FIG. 7A and FIG. 7B, the optical imaging lens assembly includes sequentially from an object side to an image side: a first lens E1, a second lens E2, a diaphragm STO (not shown), a third lens E3, a fourth lens E4, a fifth lens E5, a sixth lens E6, an optical filter (not shown), and an image plane S15 (not shown).

The first lens E1 has a negative refractive power, an object-side surface S1 of the first lens E1 is a concave surface, and an image-side surface S2 of the first lens E1 is a concave surface. The second lens E2 has a positive refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a convex surface. The fourth lens E4 has a negative refractive power, an object-side surface S7 of the fourth lens E4 is a convex surface, and an image-side surface S8 of the fourth lens E4 is a concave surface. The fifth lens E5 has a positive refractive power, an object-side surface S9 of the fifth lens E5 is a convex surface, and an image-side surface S10 of the fifth lens E5 is a convex surface. The sixth lens E6 has a negative refractive power, an object-side surface S11 of the sixth lens E6 is a convex surface, and an image-side surface S12 of the sixth lens E6 is a concave surface. The optical filter has an object-side surface S13 and an image-side surface S14. Light from an object sequentially passes through the surfaces S1-S14 and finally forms an image on the image plane S15.

In this example, half of a maximum field-of-view Semi-FOV of the optical imaging lens assembly is 65.1°.

As shown in FIG. 7A and FIG. 7B, the optical imaging lens assembly may include a lens barrel accommodating the first lens to the sixth lens and a first spacing element to a fifth spacing element. The optical imaging lens assembly may include five spacing elements located between the first lens and the sixth lens, respectively, namely, the first spacing element P1, a second spacing element P2, a third spacing element P3, a fourth spacing element P4 and the fifth spacing element P5.

It should be understood that in this example, the structure and parameters of each spacing element in the two implementations are only exemplarily listed, and the specific structure and actual parameters of each spacing element are not explicitly limited. The specific structure and actual parameters of each spacing element may be set in any suitable method in actual production.

Table 10 shows a table of basic parameters of the optical imaging lens assembly in Embodiment 4. Here, the units of a radius of curvature, a thickness/distance and a focal length are millimeters (mm). Table 11 shows a table of basic parameters of each spacing element of the optical imaging lens assembly in the two implementations in Embodiment 4, where the units of each parameter in Table 11 are millimeters (mm). Table 12-1 and Table 12-2 show the high-order coefficients applicable to the aspheric surfaces in Embodiment 4. Here, the surface type of each aspheric surface may be defined using the formula (1) given in Embodiment 1.

TABLE 10

| surface number | surface type | radius of curvature | thickness/ distance | refractive index | abbe number | focal length | conic coefficient |
|---|---|---|---|---|---|---|---|
| | | | | material | | | |
| OBJ | spherical | infinite | infinite | | | | |
| S1 | aspheric | −5.8250 | 0.3000 | 1.55 | 55.9 | −4.53 | 2.4524 |
| S2 | aspheric | 4.3853 | 0.6099 | | | | 0.0000 |
| S3 | aspheric | 2.2061 | 0.3000 | 1.62 | 25.9 | 7.80 | −0.1660 |
| S4 | aspheric | 3.8442 | 0.1478 | | | | 5.4570 |
| STO | spherical | infinite | 0.0475 | | | | |
| S5 | aspheric | 18.2223 | 0.5906 | 1.55 | 55.9 | 2.78 | 0.0000 |
| S6 | aspheric | −1.6370 | 0.1725 | | | | 0.0000 |
| S7 | aspheric | 27.2755 | 0.2810 | 1.68 | 19.2 | −5.60 | 0.0000 |
| S8 | aspheric | 3.3241 | 0.1795 | | | | 0.3996 |
| S9 | aspheric | −8.1276 | 1.4500 | 1.55 | 55.9 | 1.62 | 0.0000 |
| S10 | aspheric | −0.8482 | 0.0300 | | | | −0.9914 |
| S11 | aspheric | 1.5262 | 0.4700 | 1.67 | 23.4 | −2.29 | −1.4835 |
| S12 | aspheric | 0.6703 | 0.6087 | | | | −3.3439 |
| S13 | spherical | infinite | 0.1100 | 1.52 | 64.2 | | |
| S14 | spherical | infinite | 0.6025 | | | | |
| S15 | spherical | infinite | | | | | |

TABLE 11

| structural parameter | implementation 1 | implementation 2 |
|---|---|---|
| EP01 | 0.908 | 0.908 |
| D1s | 5.303 | 4.406 |
| D1m | 5.303 | 4.405 |
| d1s | 3.006 | 3.029 |
| d1m | 3.006 | 3.029 |
| D0s | 6.455 | 6.455 |
| d0s | 5.778 | 5.778 |
| d2s | 1.426 | 1.477 |
| D2s | 5.522 | 3.963 |
| EP12 | 0.451 | 0.474 |
| EP23 | 0.387 | 0.453 |
| d3s | 1.806 | 1.914 |
| CP3 | 0.028 | 0.018 |
| EP34 | 0.643 | 0.646 |

TABLE 11-continued

| structural parameter | implementation 1 | implementation 2 |
|---|---|---|
| D4s | 6.300 | 4.743 |
| d4s | 2.913 | 2.799 |
| CP4 | 0.028 | 0.018 |
| EP45 | 0.751 | 0.674 |
| D5s | 6.251 | 6.567 |
| d5s | 4.659 | 4.685 |
| D5m | 6.620 | 7.000 |
| d5m | 5.585 | 5.578 |
| CP5 | 0.618 | 0.626 |
| D0m | 7.610 | 7.610 |
| d0m | 7.215 | 7.215 |
| L | 5.180 | 5.180 |

TABLE 12-1

| surface number | A4 | A6 | A8 | A10 | A12 | A14 | A16 |
|---|---|---|---|---|---|---|---|
| S1 | 1.0278E+00 | 2.3649E−01 | 4.9523E−02 | −1.0166E−02 | 7.2688E−03 | −2.7120E−03 | 9.1300E−04 |
| S2 | 4.4746E−01 | −2.0397E−01 | 4.1920E−02 | 8.1056E−03 | −3.9709E−03 | −2.4610E−03 | 1.8951E−03 |
| S3 | −6.5539E−02 | −7.0967E−03 | 3.0038E−03 | 5.7799E−04 | −2.0441E−04 | −1.1960E−04 | 1.2226E−05 |
| S4 | 3.7187E−03 | 2.4972E−03 | 1.4403E−03 | 4.2329E−04 | 9.8224E−05 | 2.3150E−05 | 1.0416E−05 |
| S5 | −6.1221E−03 | 3.5551E−05 | 2.3294E−04 | 1.4693E−04 | 1.1645E−05 | 1.0224E−05 | −9.2059E−06 |
| S6 | −1.0036E−01 | −3.1134E−03 | −2.9447E−04 | 1.0745E−03 | 6.2073E−04 | 2.6598E−04 | 9.0989E−05 |
| S7 | −2.7024E−01 | 4.7476E−03 | −5.7848E−03 | 1.6270E−03 | 3.8594E−04 | 2.7221E−04 | −1.0034E−04 |
| S8 | −3.6216E−01 | 6.2574E−02 | −1.3788E−02 | 3.3302E−03 | −1.1656E−03 | 4.0021E−04 | −2.6825E−05 |
| S9 | −4.9398E−02 | 4,2027E−02 | −7.5591E−03 | −5.2582E−03 | 6,0619E−04 | 7.5220E−04 | 3.2791E−04 |
| S10 | 7.0574E−01 | −3.7079E−02 | 5.1470E−02 | −2.5231E−02 | −5.0966E−03 | −3.8809E−03 | 3.2541E−03 |
| S11 | −2.4663E+00 | 5.6969E−01 | −1.2165E−01 | 3.8444E−02 | −2.4115E−02 | 9.5683E−03 | −1.5868E−03 |
| S12 | −1.8728E+00 | 2.9206E−01 | −1.0003E−01 | 5.2159E−02 | −2.1214E−02 | 7.6177E−03 | −4.7431E−03 |

TABLE 12-2

| surface number | A18 | A20 | A22 | A24 | A26 | A28 | A30 |
|---|---|---|---|---|---|---|---|
| S1 | −4.1131E−04 | 2.1800E−04 | −7.0062E−05 | 6.9157E−05 | −2.8039E−05 | 3.3846E−06 | −1.2885E−05 |
| S2 | 1.9909E−04 | −4.4902E−04 | 2.7894E−05 | 1.1614E−04 | −1.8165E−05 | −4.1156E−05 | 1.0439E−05 |
| S3 | 7.2529E−06 | 4.3307E−06 | −4.2992E−06 | 1.6048E−06 | 2.0025E−06 | −1.9680E−07 | −3.1021E−07 |
| S4 | 6.4297E−06 | 5.4850E−06 | 2.8871E−06 | 4.1379E−08 | −3.6619E−06 | −1.4926E−06 | 8.7386E−07 |
| S5 | 6.1664E−07 | −8.1039E−06 | −1.0487E−06 | 1.2097E−07 | 3.9585E−06 | −2.1650E−06 | 3.2333E−07 |
| S6 | 1.8944E−06 | 5.9200E−06 | −1.5802E−05 | −4.4787E−06 | −5.9903E−06 | 1.0488E−06 | 6.0599E−07 |
| S7 | −6.5929E−05 | −5.1420E−05 | 8.5055E−06 | 5.1208E−06 | 1.1657E−05 | −2.7665E−06 | −3.7942E−07 |
| S8 | 7.3836E−05 | 2.5039E−05 | −2.2536E−05 | −3.2162E−05 | −1.3969E−05 | 1.8738E−06 | 5.4416E−06 |
| S9 | −1.2450E−04 | 1.2295E−04 | −6.0117E−06 | −4.9692E−05 | −3.2870E−05 | 6.5000E−06 | 6.8331E−06 |
| S10 | 1.2922E−03 | 6.4088E−04 | −5.2114E−04 | −1.1467E−04 | −5.1266E−05 | 9.1028E−05 | −2.5356E−05 |
| S11 | 1.4943E−03 | −8.5982E−04 | 4.1046E−04 | −1.1020E−04 | −1.7757E−04 | 7.7853E−05 | −1.8047E−05 |
| S12 | 2.7692E−03 | −1.1913E−03 | 1.3281E−03 | −2.7721E−04 | 2.0535E−04 | −1.3417E−04 | −7.5611E−05 |

FIG. 8A illustrates a longitudinal aberration curve of the optical imaging lens assembly according to Embodiment 4, representing deviations of focal points converged by light of different wavelengths after passing through the lens assembly. FIG. 8B illustrates an astigmatic curve of the optical imaging lens assembly according to Embodiment 4, representing a curvature of a tangential image plane and a curvature of a sagittal image plane. FIG. 8C illustrates a distortion curve of the optical imaging lens assembly according to Embodiment 4, representing amounts of distortion corresponding to different image heights. FIG. 8D illustrates a lateral color curve of the optical imaging lens assembly according to Embodiment 4, representing deviations of different image heights on the image plane formed by light passing through the lens assembly. It can be seen from FIGS. 8A-8D that the optical imaging lens assembly given in Embodiment 4 can achieve a good imaging quality.

In summary, Embodiments 1-4 satisfy the relationships shown in Table 13-1 and Table 13-2.

TABLE 13-1

| conditional expression/embodiment | embodiment 1 | | embodiment 2 | |
|---|---|---|---|---|
| | implementation 1 | implementation 2 | implementation 1 | implementation 2 |
| (EP01 + T12)/(R1 + R2) | −0.75 | −0.76 | −0.63 | −0.61 |
| R2 × (D1s − d1s)/|R1 × (D0s − d0s)| | 4.80 | 2.28 | 4.10 | 2.64 |
| f2/(d1m − d2s) | 7.35 | 4.73 | 6.81 | 7.36 |
| R4 × (D2s − d2s)/(R3 × (D1m − d1m)) | 2.26 | 3.64 | 2.75 | 2.80 |
| |f3/EP12 + f4/EP23| | 10.62 | 7.19 | 7.95 | 5.19 |
| R4/d2s + R5/d3s | 6.09 | 6.38 | 19.31 | 16.14 |
| R6/(EP23 + CP3 + CT2) | −2.88 | −2.60 | −2.91 | −2.63 |
| |f4/(EP34 − CT4) + R7/D4s| | 6.84 | 4.72 | 11.56 | 9.80 |
| R8/d4s + T45/CP4 | 6.80 | 9.33 | 5.39 | 7.77 |
| R7/(EP23 + CT3) | 33.53 | 30.80 | 18.32 | 16.77 |
| EP45/CT5 + |R10|/(D5s − d5s) | 0.99 | 0.79 | 1.11 | 0.87 |
| |f6|/(D5m − d5m) + (R11 + R12)/CP5 | 6.24 | 7.01 | 6.20 | 5.63 |
| L/(Tan(Semi-FOV) × (D0m − d0m)) | 6.51 | 6.51 | 7.08 | 7.08 |

TABLE 13-2

| conditional expression/embodiment | embodiment 3 | | embodiment 4 | |
|---|---|---|---|---|
| | implementation 1 | implementation 2 | implementation 1 | implementation 2 |
| (EP01 + T12)/(R1 + R2) | −0.55 | −0.53 | −1.05 | −1.05 |
| R2 × (D1s − d1s)/|R1 × (D0s − d0s)| | 3.24 | 2.17 | 2.55 | 1.53 |
| f2/(d1m − d2s) | 5.96 | 8.00 | 4.94 | 5.02 |
| R4 × (D2s − d2s)/(R3 × (D1m − d1m)) | 2.74 | 2.53 | 3.11 | 3.15 |
| |f3/EP12 + f4/EP23| | 5.51 | 4.96 | 8.31 | 6.50 |
| R4/d2s + R5/d3s | 11.81 | 11.34 | 12.79 | 12.12 |
| R6/(EP23 + CP3 + CT2) | −2.91 | −2.73 | −2.29 | −2.12 |
| |f4/(EP34 − CT4) + R7/D4s| | 6.35 | 3.52 | 11.17 | 9.61 |
| R8/d4s + T45/CP4 | 4.43 | 6.28 | 7.55 | 11.16 |
| R7/(EP23 + CT3) | 54.50 | 51.35 | 27.90 | 26.13 |
| EP45/CT5 + |R10|/(D5s − d5s) | 1.03 | 1.01 | 1.05 | 0.92 |
| |f6|/(D5m − d5m) + (R11 + R12)/CP5 | 5.76 | 5.37 | 5.77 | 5.12 |
| L/(Tan(Semi-FOV) × (D0m − d0m)) | 5.80 | 5.80 | 6.09 | 6.09 |

The present disclosure further provides an imaging apparatus having an electronic photosensitive element which may be a photosensitive charge-coupled device (CCD) or complementary metal-oxide semiconductor (CMOS). The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combination of the above technical features or equivalent features thereof without departing from the concept of the invention, such as, technical solutions formed by replacing the features as disclosed in the present disclosure with (but not limited to) technical features with similar functions.

What is claimed is:

1. An optical imaging lens assembly, comprising:
a lens group, comprising sequentially along an optical axis from an object side to an image side: a first lens, a second lens, a third lens, a fourth lens, a fifth lens and a sixth lens that have refractive powers, wherein there is an air spacing between any adjacent two lenses in the first lens to the sixth lens along the optical axis, and an air spacing between the fifth lens and the sixth lens is minimum;
at least one spacing element, comprising: a fourth spacing element disposed on an image side of the fourth lens and partially in contact with an image-side surface of the fourth lens; and
a lens barrel, for accommodating the lens group and the at least one spacing element;
wherein the optical imaging lens assembly satisfies: $4.0 < R8/d4s + T45/CP4 < 11.5$, wherein R8 is a radius of curvature of the image-side surface of the fourth lens, T45 is an air spacing between the fourth lens and the fifth lens on the optical axis, d4s is an inner diameter of an object-side surface of the fourth spacing element, and CP4 is a maximum thickness of the fourth spacing element, and
wherein the optical imaging lens assembly satisfies: $5.5 < L/(\text{Tan (Semi-FOV)} \times (D0m - d0m)) < 7.5$, wherein L is a distance from an object-side end of the lens barrel to an image-side end of the lens barrel on the optical axis, Semi-FOV is half of a maximum field-of-view of the optical imaging lens assembly, D0m is an outer diameter of the image-side end of the lens barrel, and d0m is an inner diameter of the image-side end of the lens barrel.

2. The optical imaging lens assembly according to claim 1, wherein the at least one spacing element further comprises a first spacing element disposed on an image side of the first lens and partially in contact with an image-side surface of the first lens.

3. The optical imaging lens assembly according to claim 2, wherein the optical imaging lens assembly satisfies: $1.5 < R2 \times (D1s - d1s)/|R1 \times (D0s - d0s)| < 5.0$, wherein R1 is a radius of curvature of an object-side surface of the first lens, R2 is a radius of curvature of the image-side surface of the first lens, D1s is an outer diameter of an object-side surface of the first spacing element, d1s is an inner diameter of the object-side surface of the first spacing element, D0s is an outer diameter of the object-side end of the lens barrel, and d0s is an inner diameter of the object-side end of the lens barrel.

4. The optical imaging lens assembly according to claim 2, wherein the at least one spacing element further comprises a second spacing element disposed on an image side of the second lens and partially in contact with an image-side surface of the second lens, and
the optical imaging lens assembly satisfies: $4.5 < f2/(d1m - d2s) \leq 8.0$, wherein f2 is an effective focal length of the second lens, dim is an inner diameter of an image-side surface of the first spacing element, and d2s is an inner diameter of an object-side surface of the second spacing element.

5. The optical imaging lens assembly according to claim 2, wherein the optical imaging lens assembly satisfies: $-1.5 < (EP01 + T12)/(R1 + R2) < -0.5$, wherein EP01 is a spacing distance from the object-side end of the lens barrel to an object-side surface of the first spacing element in a direction along the optical axis, T12 is an air spacing between the first lens and the second lens on the optical axis, R1 is a radius of curvature of an object-side surface of the first lens, and R2 is a radius of curvature of the image-side surface of the first lens.

6. The optical imaging lens assembly according to claim 4, wherein the optical imaging lens assembly satisfies: $2.0 < R4 \times (D2s - d2s)/(R3 \times (D1m - d1m)) < 4.0$, wherein R3 is a radius of curvature of an object-side surface of the second lens, R4 is a radius of curvature of the image-side surface of the second lens, D2s is an outer diameter of the object-side surface of the second spacing element, and D1m is an outer diameter of the image-side surface of the first spacing element.

7. The optical imaging lens assembly according to claim 4, wherein the at least one spacing element further comprises a third spacing element disposed on an image side of the third lens and partially in contact with an image-side surface of the third lens, and
the optical imaging lens assembly satisfies: $4.5 < |f3/EP12 + f4/EP23| < 11.0$, wherein f3 is an effective focal length of the third lens, f4 is an effective focal length of the fourth lens, EP12 is a spacing distance between the image-side surface of the first spacing element and the object-side surface of the second spacing element in the direction along the optical axis, and EP23 is a spacing distance between an image-side surface of the second spacing element and an object-side surface of the third spacing element in the direction along the optical axis.

8. The optical imaging lens assembly according to claim 7, wherein the optical imaging lens assembly satisfies: $6.0 < R4/d2s + R5/d3s < 20.0$, wherein R4 is a radius of curvature of the image-side surface of the second lens, R5 is a radius of curvature of an object-side surface of the third lens, and d3s is an inner diameter of the object-side surface of the third spacing element.

9. The optical imaging lens assembly according to claim 7, wherein the optical imaging lens assembly satisfies: $-3.0 < R6/(EP23 + CP3 + CT2) < -2.0$, wherein R6 is a radius of curvature of the image-side surface of the third lens, CP3 is a maximum thickness of the third spacing element, and CT2 is a center thickness of the second lens on the optical axis.

10. The optical imaging lens assembly according to claim 7, wherein the optical imaging lens assembly satisfies: $3.5 < |f4/(EP34 - CT4) + R7/D4s| < 12.0$, wherein EP34 is a spacing distance between an image-side surface of the third spacing element and the object-side surface of the fourth spacing element in the direction along the optical axis, CT4 is a center thickness of the fourth lens on the optical axis, R7 is a radius of curvature of an object-side surface of the fourth lens, and D4s is an outer diameter of the object-side surface of the fourth spacing element.

11. The optical imaging lens assembly according to claim 7, wherein the optical imaging lens assembly satisfies: 16.0<R7/(EP23+CT3)<55.0, wherein R7 is a radius of curvature of an object-side surface of the fourth lens, and CT3 is a center thickness of the third lens on the optical axis.

12. The optical imaging lens assembly according to claim 10, wherein the at least one spacing element further comprises a fifth spacing element disposed on an image side of the fifth lens and partially in contact with an image-side surface of the fifth lens, and the optical imaging lens assembly satisfies: 0.5<EP45/CT5+|R10|/(D5s-d5s)<1.5, wherein EP45 is a spacing distance between an image-side surface of the fourth spacing element and an object-side surface of the fifth spacing element in the direction along the optical axis, CT5 is a center thickness of the fifth lens on the optical axis, R10 is a radius of curvature of the image-side surface of the fifth lens, D5s is an outer diameter of the object-side surface of the fifth spacing element, and d5s is an inner diameter of the object-side surface of the fifth spacing element.

13. The optical imaging lens assembly according to claim 12, wherein the optical imaging lens assembly satisfies: 5.0<|f6|/(D5m-d5m)+(R11+R12)/CP5<7.5, wherein f6 is an effective focal length of the sixth lens, D5m is an outer diameter of an image-side surface of the fifth spacing element, d5m is an inner diameter of the image-side surface of the fifth spacing element, R11 is a radius of curvature of an object-side surface of the sixth lens, R12 is a radius of curvature of an image-side surface of the sixth lens, and CP5 is a maximum thickness of the fifth spacing element.

14. An optical imaging lens assembly, comprising:

a lens group, comprising sequentially along an optical axis from an object side to an image side: a first lens, a second lens, a third lens, a fourth lens, a fifth lens and a sixth lens that have refractive powers, wherein there is an air spacing between any adjacent two lenses in the first lens to the sixth lens along the optical axis, and an air spacing between the fifth lens and the sixth lens is minimum;

at least one spacing element, comprising: a first spacing element disposed on an image side of the first lens and partially in contact with an image-side surface of the first lens, a second spacing element disposed on an image side of the second lens and partially in contact with an image-side surface of the second lens, and a fourth spacing element disposed on an image side of the fourth lens and partially in contact with an image-side surface of the fourth lens; and a lens barrel, for accommodating the lens group and the at least one spacing element;

wherein the optical imaging lens assembly satisfies: 4.0<R8/d4s+T45/CP4<11.5, wherein R8 is a radius of curvature of the image-side surface of the fourth lens, T45 is an air spacing between the fourth lens and the fifth lens on the optical axis, d4s is an inner diameter of an object-side surface of the fourth spacing element, and CP4 is a maximum thickness of the fourth spacing element; and where the optical imaging lens assembly satisfies: 4.5<f2/(d1m-d2s)<8.0, wherein f2 is an effective focal length of the second lens, dim is an inner diameter of an image-side surface of the first spacing element, and d2s is an inner diameter of an object-side surface of the second spacing element.

15. The optical lens assembly according to claim 14, wherein the optical imaging lens assembly satisfies: 1.5<R2× (D1s-d1s)/|R1×(D0s−d0s)|<5.0, wherein R1 is a radius of curvature of an object-side surface of the first lens, R2 is a radius of curvature of the image-side surface of the first lens, D1s is an outer diameter of an object-side surface of the first spacing element, d1s is an inner diameter of the object-side surface of the first spacing element, D0s is an outer diameter of an object-side end of the lens barrel, and d0s is an inner diameter of the object-side end of the lens barrel.

16. The optical imaging lens assembly according to claim 14, wherein the optical imaging lens assembly satisfies:−1.5<(EP01+T12)/(R1+R2)<−0.5, wherein EP01 is a spacing distance from an object-side end of the lens barrel to an object-side surface of the first spacing element in a direction along the optical axis, T12 is an air spacing between the first lens and the second lens on the optical axis, R1 is a radius of curvature of an object-side surface of the first lens, and R2 is a radius of curvature of the image-side surface of the first lens.

17. An optical imaging lens assembly, comprising:

a lens group, comprising sequentially along an optical axis from an object side to an image side: a first lens, a second lens, a third lens, a fourth lens, a fifth lens and a sixth lens that have refractive powers, wherein there is an air spacing between any adjacent two lenses in the first lens to the sixth lens along the optical axis, and an air spacing between the fifth lens and the sixth lens is minimum;

at least one spacing element, comprising: a first spacing element disposed on an image side of the first lens and partially in contact with an image-side surface of the first lens, and a fourth spacing element disposed on an image side of the fourth lens and partially in contact with an image-side surface of the fourth lens; and a lens barrel, for accommodating the lens group and the at least one spacing element;

wherein the optical imaging lens assembly satisfies: 4.0<R8/d4s+T45/CP4<11.5, wherein R8 is a radius of curvature of the image-side surface of the fourth lens, T45 is an air spacing between the fourth lens and the fifth lens on the optical axis, d4s is an inner; and wherein the optical imaging lens assembly satisfies:−1.5<(EP01+T12)/(R1+R2)<−0.5, wherein EP01 is a spacing distance from an object-side end of the lens barrel to an object-side surface of the first spacing element in a direction along the optical axis, T12 is an air spacing between the first lens and the second lens on the optical axis, R1 is a radius of curvature of an object-side surface of the first lens, and R2 is a radius of curvature of the image-side surface of the first lens.

18. The optical lens assembly according to claim 17, wherein the optical imaging lens assembly satisfies: 1.5<R2×(D1s-d1s)/|R1×(D0s−d0s)|<5.0, wherein D1s is an outer diameter of the object-side surface of the first spacing element, d1s is an inner diameter of the object-side surface of the first spacing element, D0s is an outer diameter of the object-side end of the lens barrel, and d0s is an inner diameter of the object-side end of the lens barrel.

* * * * *